US010779235B2

(12) United States Patent
Cheng et al.

(10) Patent No.: US 10,779,235 B2
(45) Date of Patent: Sep. 15, 2020

(54) METHOD AND APPARATUS FOR WAKING UP WIRELESS DEVICE

(71) Applicant: Huawei Technologies Co., Ltd., Shenzhen (CN)

(72) Inventors: Yong Cheng, Shenzhen (CN); Ping Fang, Shenzhen (CN); Gaokun Pang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/325,959

(22) PCT Filed: Jul. 27, 2017

(86) PCT No.: PCT/CN2017/094776
§ 371 (c)(1),
(2) Date: Feb. 15, 2019

(87) PCT Pub. No.: WO2018/032954
PCT Pub. Date: Feb. 22, 2018

(65) Prior Publication Data
US 2019/0191375 A1    Jun. 20, 2019

(30) Foreign Application Priority Data

Aug. 16, 2016   (CN) .......................... 2016 1 0674389
Sep. 14, 2016   (CN) .......................... 2016 1 0825688
Dec. 30, 2016   (CN) .......................... 2016 1 1270950

(51) Int. Cl.
*H04W 52/02*      (2009.01)
*H04L 1/16*       (2006.01)
*H04W 56/00*      (2009.01)

(52) U.S. Cl.
CPC ....... *H04W 52/0229* (2013.01); *H04L 1/1607* (2013.01); *H04W 56/00* (2013.01);
(Continued)

(58) Field of Classification Search
CPC .. H04W 52/0229; H04W 56/00; H04L 1/1607
See application file for complete search history.

(56) References Cited

U.S. PATENT DOCUMENTS 8,867,667 B2    10/2014   Taghavi Nasrabadi et al.
2004/0077383 A1  4/2004   Lappetelainen et al.
(Continued)

FOREIGN PATENT DOCUMENTS

CN    102227152 A    10/2011
CN    102843758 B     4/2015
(Continued)

OTHER PUBLICATIONS

Machine Translation and Abstract of Chinese Publication No. CN105813077, Jul. 27, 2016, 12 pages.
(Continued)

*Primary Examiner* — Zhiren Qin
(74) *Attorney, Agent, or Firm* — Conley Rose, P.C.

(57) ABSTRACT

A method and an apparatus for waking up a wireless device to resolve a problem that power consumption and communication overheads are large during wake-up of a wireless device. The method includes obtaining, by a first wireless device, indication information of at least one second wireless device using a main communications circuit of the first wireless device, where the indication information includes at least one of a power saving requirement or wake-up capability information, determining, by the first wireless device, an operation mode of an auxiliary wake-up circuit of the first wireless device based on a quantity of second wireless devices or the indication information, and receiving, by the auxiliary wake-up circuit of the first wireless device based on the operation mode, a wake-up packet from the second wireless device to wake up the main communications circuit of the first wireless device.

14 Claims, 10 Drawing Sheets

(52) U.S. Cl.
CPC .............. *Y02D 70/00* (2018.01); *Y02D 70/10* (2018.01); *Y02D 70/14* (2018.01); *Y02D 70/20* (2018.01)

(56) References Cited

U.S. PATENT DOCUMENTS

| | | | |
|---|---|---|---|
| 2014/0112226 A1 | 4/2014 | Jafarian et al. | |
| 2014/0112229 A1* | 4/2014 | Merlin | H04W 52/0225 370/311 |
| 2015/0071151 A1 | 3/2015 | Bradley et al. | |
| 2016/0295511 A1 | 10/2016 | Qi et al. | |
| 2017/0003736 A1* | 1/2017 | Turon | G06F 1/3296 |
| 2018/0041959 A1 | 2/2018 | Yang et al. | |
| 2018/0049130 A1* | 2/2018 | Huang | H04W 56/001 |
| 2018/0234918 A1* | 8/2018 | Asterjadhi | H04W 52/0229 |
| 2019/0191375 A1* | 6/2019 | Cheng | H04W 52/0229 |

FOREIGN PATENT DOCUMENTS

| | | |
|---|---|---|
| CN | 104756560 A | 7/2015 |
| CN | 105723780 A | 6/2016 |
| CN | 105813077 A | 7/2016 |
| WO | 2018049924 A1 | 3/2018 |

OTHER PUBLICATIONS

Machine Translation and Abstract of International Publication No. WO2018049924, Mar. 22, 2018, 62 pages.
AMS, "AS3933 3D Low Frequency Wakeup Receiver," Jul. 1, 2010, 43 pages.
Intel, "LP-WUR: Enabling Low-Power and Low-Latency Capability for 802.11," doc.: IEEE 802.11-16/0027r0, Jan. 18, 2016, 21 pages.
Foreign Communication From a Counterpart Application, PCT Application No. PCT/CN2017/094776, English Translation of International Search Report dated Oct. 16, 2017, 2 pages.
Foreign Communication From a Counterpart Application, PCT Application No. PCT/CN2017/094776, English Translation of Written Opinion dated Oct. 16, 2017, 5 pages.
Machine Translation and Abstract of Chinese Publication No. CN102227152, Oct. 26, 2011, 22 pages.
Machine Translation and Abstract of Chinese Publication No. CN102843758, Apr. 29, 2015, 15 pages.
Foreign Communication From a Counterpart Application, Chinese Application No. 201611270950.1, Chinese Office Action dated Jul. 2, 2019, 9 pages.

* cited by examiner

METHOD AND APPARATUS FOR WAKING UP WIRELESS DEVICE

CROSS-REFERENCE TO RELATED APPLICATIONS

This application is a U.S. National Stage of International Patent Application No. PCT/CN2017/094776 filed on Jul. 27, 2017, which claims priority to Chinese Patent Application No. 201610674389.7 filed on Aug. 16, 2016, Chinese Patent Application No. 201610825688.6 filed on Sep. 14, 2016, and Chinese Patent Application No. 201611270950.1 filed on Dec. 30, 2016. All of the aforementioned applications are hereby incorporated by reference in their entireties.

TECHNICAL FIELD

The present invention relates to the communications field, and in particular, to a method and an apparatus for waking up a wireless device.

BACKGROUND

The Institute of Electrical and Electronics Engineers (Institute of Electrical and Electronics Engineers, IEEE) 802.11 standards organization plans to formulate an Internet of Things standard based on Wireless Fidelity (Wireless Fidelity, Wi-Fi), with an objective to promote application of the Wi-Fi technology to the Internet of Things field, wearable electronic devices, and digital medical devices. A Wi-Fi communications module of an existing wearable electronic device has excessively large power consumption, and cannot be directly applied to a wearable electronic device. To apply the Wi-Fi technology to the Internet of Things field and the wearable electronic devices, reducing power consumption of the Wi-Fi communications technology is very necessary.

To resolve the foregoing problem, the IEEE 802.11 standards organization proposes a wake-up radio/receiver (Wake-Up Radio/Receiver, WUR) technology with ultra-low power consumption. A WUR can be used to reduce average power consumption of the Wi-Fi communications technology, and also implement on-demand (On-Demand) real-time data transmission. According to the WUR, a radio/receiver interface with ultra-low power consumption is added to a Wi-Fi device of a device. When no data is received or transmitted, a main communications module (for example, a Wi-Fi module) of the device enters deep sleep, and the WUR module is started to perform listening with ultra-low power consumption. For example, as shown in FIG. 1, when an access point (Access Point, AP) needs to transmit data to a station (Station, STA), the AP is a wake-up device, and the STA is a waked-up device. The AP first sends a wake-up packet (Wake-Up Packet, WUP) to a WUR module of the STA. After receiving the wake-up packet, the WUR module of the STA checks a receiver address of the wake-up packet and confirms correctness and authenticity of the wake-up packet. If the receiver address of the wake-up packet matches an address of the WUR of the STA, and the wake-up packet is correct and authentic, the WUR module of the STA sends a wake-up signal to a main communications module (for example, a module) of the STA, to wake up the main communications module of the STA. After sending the wake-up signal, the WUR module of the STA may enter a deep sleep state (a state in which power consumption is close to 0). To further reduce average power consumption of the WUR, the WUR may start duty-cycling (Duty-Cycling), that is, the WUR periodically "wakes up and sleeps". In the prior art, a "synchronous wake-up" mechanism is used, that is, a second device stays time-synchronized with a WUR of a first device, and the second device can accurately find a location, on a time axis, of a wake window (Wake window) of the WUR of the first device. As shown in FIG. 2, a period of a WUR of a waked-up device is 100 milliseconds (ins), and a wake window length W is 2 milliseconds (ms). When a wake-up device needs to send data to the waked-up device, the wake-up device sends a wake-up packet (WUP) to the WUR of the waked-up device in a wake window of the WUR of the waked-up device, to wake up a main communications module of the waked-up device.

In the foregoing "synchronous wake-up" mechanism, the wake-up device needs to periodically send WUR time synchronization frames. As a result, energy overheads are relatively large, and electric energy of the wake-up device is greatly wasted. In addition, as shown in FIG. 3, when a waked-up device is connected to a plurality of different wake-up devices, for example, the waked-up device is connected to a wake-up device 1, a wake-up device 2, and a wake-up device 3, and the plurality of wake-up devices belong to different basic service sets (Basic Service Set, BBS) or belong to different networks, if the "synchronous wake-up" mechanism is used, a WUR of the waked-up device needs to maintain a plurality of pieces of clock information, and needs to periodically receive time synchronization frames from the plurality of wake-up devices. This significantly increases complexity and power consumption of the WUR module of the waked-up device, and reduces a standby time of a battery of the waked-up device. In addition, the plurality of wake-up devices separately send the time synchronization frames, thereby wasting a large quantity of air-interface time-frequency resources.

SUMMARY

Embodiments of this application provide a method and an apparatus for waking up a wireless device, to reduce energy and resource overheads during wake-up of a wireless device.

An embodiment of this application provides a method for waking up a wireless device, including: obtaining, by a first wireless device, indication information of at least one second wireless device by using a main communications module of the first wireless device, where the indication information includes at least one of a power saving requirement or wake-up capability information, and the wake-up capability information is used to indicate that the second wireless device supports synchronous wake-up and/or asynchronous wake-up; determining, by the first wireless device, an operation mode of an auxiliary wake-up module of the first wireless device based on a quantity of second wireless devices and/or the indication information, where the operation mode includes a time synchronization mechanism and/or a sleep mode of the auxiliary wake-up module; and receiving, by the auxiliary wake-up module of the first wireless device based on the operation mode, a wake-up packet sent by the second wireless device, to wake up the main communications module of the first wireless device. In this embodiment of this application, the first wireless device may be understood as a waked-up device, and the second wireless device may be understood as a wake-up device. The first wireless device determines the operation mode of the auxiliary wake-up module of the first wireless device based on the quantity of second wireless devices and/or the indication information. The auxiliary wake-up module receives, based on the operation mode, the wake-up packet sent by the second wireless device, to wake up the main communications module of the first wireless device. This can effectively balance energy consumption of the first wireless device and the second wireless device, and avoid additional energy consumption and communication overheads that are brought by a complex time synchronization operation and time synchronization retention.

In a possible design, the method further includes: sending, by the first wireless device, the operation mode of the auxiliary wake-up module to the at least one second wireless device. In this way, the at least one second wireless device may send the wake-up packet to the first wireless device based on the operation mode of the first wireless device, to wake up the main communications module of the first wireless device.

In a possible design, before the receiving, by the auxiliary wake-up module of the first wireless device based on the operation mode, a wake-up packet sent by the second wireless device, the method further includes: receiving, by the first wireless device, an acknowledgement message sent by the second wireless device, where the acknowledgement message is used to indicate that the operation mode is accepted by the second wireless device; or receiving, by the first wireless device, an operation mode that is of the auxiliary wake-up module of the first wireless device and that is determined by the second wireless device. In this way, if the operation mode set by the first wireless device is rejected by the second wireless device, the second wireless device may set the operation mode of the auxiliary wake-up module of the first wireless device.

In a possible design, the setting, by the first wireless device, an operation mode of an auxiliary wake-up module of the first wireless device based on a quantity of second wireless devices and/or the indication information includes: setting, by the first wireless device, the operation mode of the auxiliary wake-up module of the first wireless device based on a priority relationship between at least two of the following three parameters: the quantity of second wireless devices, the power saving requirement of the second wireless device, and the wake-up capability information of the second wireless device, where the priority relationship includes at least one of the following: a priority of the wake-up capability information is higher than that of the quantity of second wireless devices, or the priority of the quantity of second wireless devices is higher than that of the power saving requirement. In this way, the first wireless device may set the operation mode of the auxiliary wake-up module based on the priority of the quantity of second wireless devices, the priority of the power saving requirement of the second wireless device, and the priority of the wake-up capability information of the second wireless device, to balance energy consumption of the first wireless device and the second wireless device, adapt to a plurality of application environments, and satisfy power saving requirements of different devices.

In a possible design, if the indication information includes the wake-up capability information, or if the indication information includes the wake-up capability information and the power saving requirement, the determining, by the first wireless device, a time synchronization mechanism of an auxiliary wake-up module of the first wireless device based on a quantity of second wireless devices and the indication information includes: determining, by the first wireless device based on the priority relationship, that the time synchronization mechanism of the auxiliary wake-up module of the first wireless device is to be determined based on the wake-up capability information, including: if the wake-up capability information is used to represent that the second wireless device supports only synchronous wake-up, determining, by the first wireless device, that the auxiliary wake-up module of the first wireless device needs to stay time-synchronized with the second wireless device; or if the wake-up capability information is used to represent that the second wireless device supports only asynchronous wake-up, determining that auxiliary wake-up module of the first wireless device does not need to stay time-synchronized with the second wireless device. In this way, the first wireless device may choose, depending on a difference in the wake-up capability information, to set the auxiliary wake-up module to be time-synchronized with the second wireless device or not to be time-synchronized with the second wireless device. When the auxiliary wake-up module of the first wireless device does not need to stay time-synchronized with the second wireless device, energy consumption of the first wireless device and the second wireless device can be effectively balanced, and additional energy consumption and communication overheads that are brought by a complex time synchronization operation and time synchronization retention are avoided.

In a possible design, if the indication information includes the power saving requirement, the setting, by the first wireless device, a time synchronization mechanism of an auxiliary wake-up module of the first wireless device based on a quantity of second wireless devices and the indication information includes: determining, by the first wireless device based on the priority relationship, that the priority of the quantity of second wireless devices is higher than the priority of the power saving requirement, including: if the quantity of second wireless devices is equal to 1, or the quantity of second wireless devices is greater than or equal to 2 and the second wireless devices belong to a same basic service set, determining, by the first wireless device, whether the power saving requirement represents that the second wireless device requires power saving; and if determining that the power saving requirement represents that the second wireless device requires power saving, setting, by the first wireless device, the auxiliary wake-up module of the wireless device not to be time-synchronized with the second wireless device; or if determining that the power saving requirement represents that the second wireless device does not require power saving, setting, by the first wireless device, the auxiliary wake-up module of the first wireless device to be time-synchronized with the second wireless device; or if the quantity of second wireless devices is greater than or equal to 2, and the second wireless devices belong to different basic service sets, setting, by the first wireless device, the auxiliary wake-up module of the first wireless device not to be time-synchronized with the second wireless device. In this way, the first wireless device may choose, depending on a difference in the quantity of wake-up devices, to set the auxiliary wake-up module to be time-synchronized with the second wireless device or not to be time-synchronized with the second wireless device. When the auxiliary wake-up module of the first wireless device does not need to stay time-synchronized with the second wireless device, energy consumption of the first wireless device and the second wireless device can be effectively balanced, and additional energy consumption and communication overheads that are brought by a complex time synchronization operation and time synchronization retention are avoided. In addition, if the operation mode of the auxiliary wake-up module of the waked-up device cannot be determined based only on the quantity of wake-up devices, the operation mode of the auxiliary wake-up module of the waked-up device may be further determined based on power saving information of the wake-up device.

In a possible design, the sleep mode includes a duty-cycling period and a wake window length of the auxiliary wake-up module; and the setting, by the first wireless device, an operation mode of an auxiliary wake-up module of the first wireless device based on a quantity of second wireless devices and/or the indication information includes: setting, by the first wireless device, the duty-cycling period and the wake window length of the auxiliary wake-up module of the first wireless device based on the quantity of second wireless devices and/or the indication information, so that the second wireless device determines a quantity of wake-up packets and a time interval between the wake-up packets based on the duty-cycling period and the wake window length of the auxiliary wake-up module, where the time interval is less than or equal to the window length, and when the auxiliary wake-up module stays time-synchronized with the second wireless device, the quantity of wake-up packets is greater than or equal to 1; or when the auxiliary wake-up module does not stay time-synchronized with the second wireless device, the quantity of wake-up packets is greater than or equal to a ratio of the duty-cycling period of the auxiliary wake-up module to the time interval. In this way, the second wireless device may set the quantity of wake-up packets and the time interval between the wake-up packets based on the duty-cycling period and the wake window length of the auxiliary wake-up module of the first wireless device, to ensure that the first wireless device can receive, in different operation modes, a wake-up packet sent by the second wireless device.

In a possible design, the method further includes: if the quantity of second wireless devices and/or the indication information change/changes, updating, by the first wireless device, the operation mode of the auxiliary wake-up module of the first wireless device to the second wireless device. In this way, when the quantity of second wireless devices and/or the indication information change/changes, the first wireless device may dynamically update the operation mode of the auxiliary wake-up module of the first wireless device, for example, the auxiliary wake-up module switches between two time synchronization mechanisms: "synchronous wake-up" and "asynchronous wake-up". Because there is a dynamic update operation, this technical solution of the present invention may be applicable to a plurality of application environments and satisfy power saving requirements and wake-up capability information of different devices.

According to another aspect, a method for waking up a wireless device is provided, including: determining, by a second wireless device, an operation mode of an auxiliary wake-up module of a first wireless device, where the operation mode includes a time synchronization mechanism and/or a sleep mode of the auxiliary wake-up module of the first wireless device; sending, by the second wireless device, the operation mode to the first wireless device by using a main communications module of the second wireless device; and sending, by the second wireless device, a wake-up packet to the auxiliary wake-up module of the first wireless device based on the operation mode, to wake up a main communications module of the first wireless device. The second wireless device is equivalent to a wake-up device, and the first wireless device is equivalent to a waked-up device. In this way, after the wake-up device determines the operation mode of the auxiliary wake-up module of the waked-up device, the waked-up device determines the operation mode of the auxiliary wake-up module of the waked-up device based on an indication of the wake-up device. The wake-up device may send the wake-up packet to the auxiliary wake-up module of the first wireless device based on the operation mode. When the auxiliary wake-up module of the waked-up device does not need to stay time-synchronized with the wake-up device, energy consumption and resource overheads that are brought by a complex time synchronization operation and time synchronization between the waked-up device and the wake-up device are avoided, and a problem that energy and resource overheads are large during wake-up of a wireless device is resolved.

In a possible design, the time synchronization mechanism is used to indicate that the auxiliary wake-up module of the first wireless device stays time-synchronized with the second wireless device, or the time synchronization mechanism is used to indicate that the auxiliary wake-up module of the first wireless device does not need to stay time-synchronized with the second wireless device; and the sleep mode includes a duty-cycling period and a wake window length of the auxiliary wake-up module of the first wireless device.

In a possible design, the method further includes: receiving, by the second wireless device, a feedback message sent by the first wireless device, where the feedback message is used to indicate that the first wireless device accepts the operation mode that is of the auxiliary wake-up module of the first wireless device and that is determined by the second wireless device; or the feedback message is used to indicate that the first wireless device rejects the operation mode that is of the auxiliary wake-up module of the first wireless device and that is determined by the second wireless device, and the feedback message includes an operation mode that is of the auxiliary wake-up module of the first wireless device and that is determined by the first wireless device. In this way, when the first wireless device rejects the operation mode that is of the auxiliary wake-up module of the first wireless device and that is determined by the second wireless device, the first wireless device may send, to the second wireless device, the operation mode that is of the auxiliary wake-up module of the first wireless device and that is determined by the first wireless device.

In a possible design, the method further includes: accepting, by the second wireless device, the operation mode that is of the auxiliary wake-up module of the first wireless device and that is determined by the first wireless device; and using the operation mode that is of the auxiliary wake-up module of the first wireless device and that is determined by the first wireless device, as an operation mode that is of the auxiliary wake-up module of the first wireless device and that is determined by the second wireless device. In this way, the second wireless device may use the operation mode that is of the auxiliary wake-up module of the first wireless device and that is determined by the first wireless device, as the operation mode that is of the auxiliary wake-up module of the first wireless device and that is determined by the second wireless device.

According to still another aspect, a method for waking up a wireless device is provided, including: receiving, by a first wireless device by using a main communications module, an operation mode that is of an auxiliary wake-up module of the first wireless device and that is determined and sent by a second wireless device, where the operation mode includes a time synchronization mechanism and/or a sleep mode of the auxiliary wake-up module of the first wireless device; determining, by the first wireless device, an operation mode of the auxiliary wake-up module of the first wireless device based on the operation mode received from the second wireless device; and receiving, by the auxiliary wake-up module of the first wireless device based on the operation mode that is of the auxiliary wake-up module of the first wireless device and that is determined by the first wireless device, a wake-up packet sent by the second wireless device, to wake up the main communications module of the first wireless device. In this way, the first wireless device may determine the operation mode received from the second wireless device as the operation mode of the auxiliary wake-up module of the first wireless device, so that the wake-up packet sent by the second wireless device is received based on the operation mode of the auxiliary wake-up module of the first wireless device, to wake up the main communications module of the first wireless device. The operation mode of the auxiliary wake-up module of the first wireless device is determined by using an interaction process between the first wireless device and the second wireless device. This can effectively balance energy consumption of the first wireless device and the second wireless device, and avoid additional energy consumption and communication overheads that are brought by a complex time synchronization operation and time synchronization retention.

In a possible design, the time synchronization mechanism is used to indicate that the auxiliary wake-up module of the first wireless device stays time-synchronized with the second wireless device, or the time synchronization mechanism is used to indicate that the auxiliary wake-up module of the first wireless device does not need to stay time-synchronized with the second wireless device; and the sleep mode includes a duty-cycling period and a wake window length of the auxiliary wake-up module of the first wireless device. In this way, when the auxiliary wake-up module of the first wireless device does not need to stay time-synchronized with the second wireless device, energy consumption of the first wireless device and the second wireless device can be effectively balanced, and additional energy consumption and communication overheads that are brought by a complex time synchronization operation and time synchronization retention are avoided.

In a possible design, the determining, by the first wireless device, an operation mode of the auxiliary wake-up module of the first wireless device based on the operation mode received from the second wireless device includes: accepting, by the first wireless device, the operation mode that is of the auxiliary wake-up module of the first wireless device and that is determined by the second wireless device; or rejecting, by the first wireless device, the operation mode that is of the auxiliary wake-up module of the first wireless device and that is determined by the second wireless device, and determining, by the first wireless device, the operation mode of the auxiliary wake-up module of the first wireless device based on at least one of a quantity of second wireless devices, a wake-up capability of the second wireless device, or a power saving requirement of the second wireless device. In this way, when the first wireless device rejects the operation mode that is of the auxiliary wake-up module of the first wireless device and that is determined by the second wireless device, the first wireless device may determine the operation mode of the auxiliary wake-up module of the first wireless device based on the at least one of the quantity of second wireless devices, the wake-up capability of the second wireless device, or the power saving requirement of the second wireless device.

In a possible design, the method further includes: sending, by the first wireless device, a feedback message to the second wireless device, where the feedback message is used to indicate that the first wireless device accepts the operation mode that is of the auxiliary wake-up module of the first wireless device and that is determined by the second wireless device; or the feedback message is used to indicate that the first wireless device rejects the operation mode that is of the auxiliary wake-up module of the first wireless device and that is determined by the second wireless device, and the feedback message includes an operation mode that is of the auxiliary wake-up module of the first wireless device and that is determined by the first wireless device based on at least one of a quantity of second wireless devices, a wake-up capability of the second wireless device, or a power saving requirement of the second wireless device. In this way, when the first wireless device rejects the operation mode that is of the auxiliary wake-up module of the first wireless device and that is determined by the second wireless device, the first wireless device may feed back, to the second wireless device, the operation mode that is of the auxiliary wake-up module of the first wireless device and that is determined by the first wireless device.

According to still another aspect, a first wireless device is provided, including: a main communications module, configured to obtain indication information of at least one second wireless device, where the indication information includes at least one of a power saving requirement or wake-up capability information, and the wake-up capability information is used to indicate that the second wireless device supports synchronous wake-up and/or asynchronous wake-up; a processing module, configured to determine an operation mode of an auxiliary wake-up module of the first wireless device based on a quantity of second wireless devices and/or the indication information, where the operation mode includes a time synchronization mechanism and/or a sleep mode of the auxiliary wake-up module; and the auxiliary wake-up module, configured to receive, based on the operation mode, a wake-up packet sent by the second wireless device, to wake up the main communications module of the first wireless device.

In a possible design, the main communications module is further configured to send the operation mode of the auxiliary wake-up module to the at least one second wireless device.

In a possible design, the main communications module is further configured to: receive an acknowledgement message sent by the second wireless device, where the acknowledgement message is used to indicate that the operation mode is accepted by the second wireless device; or receive an operation mode that is of the auxiliary wake-up module of the first wireless device and that is determined by the second wireless device.

In a possible design, the processing module is configured to: set the operation mode of the auxiliary wake-up module of the first wireless device based on a priority relationship between at least two of the following three parameters: the quantity of second wireless devices, the power saving requirement of the second wireless device, and the wake-up capability information of the second wireless device, where the priority relationship includes at least one of the following: a priority of the wake-up capability information is higher than that of the quantity of second wireless devices, or the priority of the quantity of second wireless devices is higher than that of the power saving requirement.

In a possible design, if the indication information includes the wake-up capability information, or if the indication information includes the wake-up capability information and the power saving requirement, the processing module is configured to: determine, based on the priority relationship, that the time synchronization mechanism of the auxiliary wake-up module of the first wireless device is to be determined based on the wake-up capability information, including: if the wake-up capability information is used to represent that the second wireless device supports only synchronous wake-up, determining that the auxiliary wake-up module of the first wireless device needs to stay time-synchronized with the second wireless device; or if the wake-up capability information is used to represent that the second wireless device supports only asynchronous wake-up, determining that auxiliary wake-up module of the first wireless device does not need to stay time-synchronized with the second wireless device.

In a possible design, if the indication information includes the power saving requirement, the processing module is configured to: determine, based on the priority relationship, that the priority of the quantity of second wireless devices is higher than the priority of the power saving requirement, including: if the quantity of second wireless devices is equal to 1; or the quantity of second wireless devices is greater than or equal to 2 and the second wireless devices belong to a same basic service set, determining whether the power saving requirement represents that the second wireless device requires power saving; and if determining that the power saving requirement represents that the second wireless device requires power saving, setting the auxiliary wake-up module of the wireless device not to be time-synchronized with the second wireless device; or if determining that the power saving requirement represents that the second wireless device does not require power saving, setting the auxiliary wake-up module of the first wireless device to be time-synchronized with the second wireless device; or if the quantity of second wireless devices is greater than or equal to 2, and the second wireless devices belong to different basic service sets, setting the auxiliary wake-up module of the first wireless device not to be time-synchronized with the second wireless device.

In a possible design, the sleep mode includes a duty-cycling period and a wake window length of the auxiliary wake-up module, and the processing module is configured to: set the duty-cycling period and the wake window length of the auxiliary wake-up module of the first wireless device based on the quantity of second wireless devices and/or the indication information, so that the second wireless device determines a quantity of wake-up packets and a time interval between the wake-up packets based on the duty-cycling period and the wake window length of the auxiliary wake-up module, where the time interval is less than or equal to the window length, and when the auxiliary wake-up module stays time-synchronized with the second wireless device, the quantity of wake-up packets is greater than or equal to 1; or when the auxiliary wake-up module does not stay time-synchronized with the second wireless device, the quantity of wake-up packets is greater than or equal to a ratio of the duty-cycling period of the auxiliary wake-up module to the time interval.

In a possible design, the processing module is further configured to: if the quantity of second wireless devices and/or the indication information change/changes, update the operation mode of the auxiliary wake-up module of the first wireless device to the second wireless device.

According to still another aspect, a second wireless device is provided, including: a processing module, configured to determine an operation mode of an auxiliary wake-up module of a first wireless device, where the operation mode includes a time synchronization mechanism and/or a sleep mode of the auxiliary wake-up module of the first wireless device; and a main communications module, configured to send the operation mode to the first wireless device, where the main communications module is further configured to send a wake-up packet to the auxiliary wake-up module of the first wireless device based on the operation mode, to wake up a main communications module of the first wireless device.

In a possible design, the time synchronization mechanism is used to indicate that the auxiliary wake-up module of the first wireless device stays time-synchronized with the second wireless device, or the time synchronization mechanism is used to indicate that the auxiliary wake-up module of the first wireless device does not need to stay time-synchronized with the second wireless device; and the sleep mode includes a duty-cycling period and a wake window length of the auxiliary wake-up module of the first wireless device.

In a possible design, the main communications module is further configured to receive a feedback message sent by the first wireless device, where the feedback message is used to indicate that the first wireless device accepts the operation mode that is of the auxiliary wake-up module of the first wireless device and that is determined by the second wireless device; or the feedback message is used to indicate that the first wireless device rejects the operation mode that is of the auxiliary wake-up module of the first wireless device and that is determined by the second wireless device, and the feedback message includes an operation mode that is of the auxiliary wake-up module of the first wireless device and that is determined by the first wireless device.

In a possible design, the processing module is further configured to: accept the operation mode that is of the auxiliary wake-up module of the first wireless device and that is determined by the first wireless device; and use the operation mode that is of the auxiliary wake-up module of the first wireless device and that is determined by the first wireless device, as an operation mode that is of the auxiliary wake-up module of the first wireless device and that is determined by the second wireless device.

According to still another aspect, a first wireless device is provided, including: a main communications module, configured to receive an operation mode that is of an auxiliary wake-up module of the first wireless device and that is determined and sent by a second wireless device, where the operation mode includes a time synchronization mechanism and/or a sleep mode of the auxiliary wake-up module of the first wireless device; a processing module, configured to determine an operation mode of the auxiliary wake-up module of the first wireless device based on the operation mode received from the second wireless device; and the auxiliary wake-up module, configured to receive, based on the operation mode that is of the auxiliary wake-up module of the first wireless device and that is determined by the first wireless device, a wake-up packet sent by the second wireless device, to wake up the main communications module of the first wireless device.

In a possible design, the time synchronization mechanism is used to indicate that the auxiliary wake-up module of the first wireless device stays time-synchronized with the second wireless device, or the time synchronization mechanism is used to indicate that the auxiliary wake-up module of the first wireless device does not need to stay time-synchronized with the second wireless device; and the sleep mode includes a duty-cycling period and a wake window length of the auxiliary wake-up module of the first wireless device.

In a possible design, the processing module is configured to: accept the operation mode that is of the auxiliary wake-up module of the first wireless device and that is determined by the second wireless device; or reject the operation mode that is of the auxiliary wake-up module of the first wireless device and that is determined by the second wireless device, and determine the operation mode of the auxiliary wake-up module of the first wireless device based on at least one of a quantity of second wireless devices, a wake-up capability of the second wireless device, or a power saving requirement of the second wireless device.

In a possible design, the main communications module is further configured to send a feedback message to the second wireless device, where the feedback message is used to indicate that the first wireless device accepts the operation mode that is of the auxiliary wake-up module of the first wireless device and that is determined by the second wireless device; or the feedback message is used to indicate that the first wireless device rejects the operation mode that is of the auxiliary wake-up module of the first wireless device and that is determined by the second wireless device, and the feedback message includes an operation mode that is of the auxiliary wake-up module of the first wireless device and that is determined by the first wireless device based on at least one of a quantity of second wireless devices, a wake-up capability of the second wireless device, or a power saving requirement of the second wireless device.

According to still another aspect, an embodiment of the present invention provides a computer storage medium, configured to store a computer software instruction used by the foregoing first wireless device. The computer software instruction includes a program designed to perform the foregoing aspects.

According to still another aspect, an embodiment of the present invention provides a computer storage medium, configured to store a computer software instruction used by the foregoing second wireless device. The computer software instruction includes a program designed to perform the foregoing aspects.

In this way, the waked-up device may set the operation mode, including the time synchronization mechanism and the sleep mode, of the auxiliary wake-up module of the waked-up device based on the quantity of wake-up devices and the indication information. The time synchronization mechanism may be synchronous wake-up or asynchronous wake-up. However, in the prior art, a time synchronization mechanism of an auxiliary wake-up module of a waked-up device may be only synchronous wake-up. When the waked-up device is connected to a plurality of different wake-up devices, the auxiliary wake-up module of the waked-up device needs to maintain a plurality of pieces of clock information, and needs to periodically receive time synchronization frames from the plurality of wake-up devices. In addition, the plurality of wake-up devices separately send the time synchronization frames, thereby wasting a large quantity of air-interface time-frequency resources. Compared with that in the prior art, in an asynchronous mode provided in the embodiments of this application, clock information does not need to be maintained, and no time synchronization frame needs to be received from a wake-up device. This can resolve a problem that additional energy consumption and communication overheads that are brought by time synchronization retention between a wake-up device and a waked-up device are large.

In addition, the present invention further provides any one of the following embodiments:

1. A method for waking up a wireless device, including: (1) obtaining, by a first wireless device, a power saving requirement and/or wake-up capability information of at least one second wireless device by using a first wireless interface of the first wireless device; (2) determining, by the first wireless device, an operation mode of a second wireless interface of the first wireless device based on one or more of "a power saving requirement of the first wireless device, wake-up capability information of the first wireless device, a quantity of second wireless devices, the power saving requirement of the second wireless device, or the wake-up capability information of the second wireless device", where the operation mode includes a time synchronization mechanism and/or a sleep mode of the second wireless interface of the first wireless device; (3) configuring, by the first wireless device, the operation mode of the second wireless interface of the first wireless device; (4) after the first wireless device receives, by using the second wireless interface of the first wireless device, a wake-up packet sent by the second wireless device, waking up, by the first wireless device, the first wireless interface of the first wireless device, to perform message transmission with the second wireless device.

In the foregoing method for waking up a wireless device, the first wireless device may be enabled to determine the operation mode of the second wireless interface of the first wireless device based on one or more of "the power saving requirement of the first wireless device, the wake-up capability information of the first wireless device, the quantity of second wireless devices, the power saving requirement of the second wireless device, or the wake-up capability information of the second wireless device".

2. The method according to 1, where before step (3), the method further includes: sending, by the first wireless device, the power saving requirement and/or the wake-up capability information of the first wireless device to the at least one second wireless device by using the first wireless interface of the first wireless device. The first wireless device sends the power saving requirement and/or the wake-up capability information of the first wireless device to the second wireless device. This can help the second wireless device determine an operation mode of a second wireless interface of the second wireless device, and can also help the second wireless device determine the operation mode of the second wireless interface of the first wireless device.

3. The method according to 1, where before step (3), the method further includes: sending, by the first wireless device, the operation mode of the second wireless interface of the first wireless device to the at least one second wireless device by using the first wireless interface of the first wireless device. The first wireless device sends the operation mode of the second wireless interface of the first wireless device to the second wireless device. This can help the second wireless device select a correct wake-up operation to wake up the first wireless interface of the first wireless device. The "correct wake-up operation" includes a time at which the second wireless device sends a wake-up packet in an attempt to wake up the first wireless device, and a quantity of wake-up packets.

4. The method according to 3, where before step (3), the method further includes: receiving, by the first wireless device by using the first wireless interface of the first wireless device, a message sent by the at least one second wireless device, where the message includes an acknowledgement message of the second wireless device for the operation mode of the second wireless interface of the first wireless device, or includes an operation mode that is of the second wireless interface of the first wireless device and that is determined by the second wireless device. The operation mode that is of the second wireless interface of the first wireless device and that is determined by the first wireless device may be accepted by the second wireless device (as described above, the acknowledgement message of the second wireless device for the operation mode of the second wireless interface of the first wireless device is received); or may be rejected by the second wireless device, and the operation mode of the second wireless interface of the first wireless device may be finally determined by the second wireless device.

5. The method according to 4, where before step (3), the method further includes: sending, by the first wireless device, an acknowledgement message for the operation mode of the second wireless interface of the first wireless device to the at least one second wireless device by using the first wireless interface of the first wireless device. When the operation mode of the second wireless interface of the first wireless device is determined by the second wireless device, the first wireless device sends the acknowledgement message to the second wireless device, to confirm that, the operation mode that is of the second wireless interface of the first wireless device and that is determined by the second wireless device is accepted.

6. The method according to any one of 1 to 5, further including: updating, by the first wireless device, the operation mode of the second wireless interface of the first wireless device when the first wireless device determines that a wake-up requirement changes, where the "when the first wireless device determines that a wake-up requirement changes" includes: a quantity of second wireless devices connected to the first wireless device increases or decreases, or a power saving requirement and/or a wake-up capability of a second wireless device connected to the first wireless device change/changes. Based on a dynamic change of the wake-up requirement, the first wireless device dynamically updates the operation mode of the second wireless interface of the first wireless device, for example, the second wireless interface switches between two modes: "synchronous wake-up" and "asynchronous wake-up". Because there is a dynamic update operation, this technical solution of the present invention may be applicable to a plurality of application environments and satisfy power saving requirements of different devices.

7. The method according to any one of 1 to 6, where the step of determining or updating the operation mode of the second wireless interface of the first wireless device may include: when there is only one second wireless device and the second wireless device supports only the "asynchronous wake-up", or there is only one second wireless device and the second wireless device requires power saving, or there are at least two second wireless devices and the second wireless devices belong to different basic service sets (BSS) or belong to different networks, determining that the operation mode of the second wireless interface of the first wireless device is the "asynchronous wake-up"; or when there is only one second wireless device and the second wireless device supports only the "synchronous wake-up", or there is only one second wireless device and the second wireless device does not require power saving, or there are at least two second wireless devices and the second wireless devices belong to a same basic service set (BSS), determining that the operation mode of the second wireless interface of the first wireless device is the "synchronous wake-up". In this technical solution, the first wireless device may be enabled to select the "synchronous wake-up" or the "asynchronous wake-up" depending on an application scenario. According to the "asynchronous wake-up" mechanism, energy consumption of the first wireless device and the second wireless device can be effectively balanced, and additional energy consumption and communication overheads that are brought by a complex time synchronization operation and time synchronization retention are avoided.

8. The method according to 7, where in the "asynchronous wake-up" mode, the second wireless device sends n wake-up packets, and needs to ensure that a time interval between the two adjacent wake-up packets that are sent is less than or equal to a wake window length of the second wireless interface of the first wireless device, where n is greater than or equal to 2. The second wireless device sends the n wake-up packets, and expects that at least one wake-up packet is received by the second wireless interface of the first wireless device. According to the "asynchronous wake-up" mechanism, energy consumption of the first wireless device and the second wireless device can be effectively balanced, and additional energy consumption and communication overheads that are brought by a complex time synchronization operation and time synchronization retention are avoided.

9. The method according to 1 and 2, the power saving requirement and/or the wake-up capability information of the second wireless device may include: the power saving requirement of the second wireless device, including power supply information of the second wireless device and/or sleep information of a first wireless interface of the second wireless device; and the wake-up capability information of the second wireless device, including information about support of the second wireless device for the second wireless interface of the first wireless device, and/or information about a second wireless interface of the second wireless device. "The power saving requirement and/or the wake-up capability information of the first wireless device" may include: the power saving requirement of the first wireless device, including power supply information of the first wireless device and/or sleep information of the first wireless interface of the first wireless device; and the wake-up capability information of the first wireless device, including information about support of the first wireless device for the second wireless interface of the second wireless device, and/or information about the second wireless interface of the first wireless device.

10. The method according to any one of 1 to 9, where the first wireless interface is an 802.11 interface, the second wireless interface is an auxiliary wake-up interface, the first wireless device is a waked-up device, and the second wireless device is a wake-up device.

11. A waked-up device, where the waked-up device may communicate with at least one wake-up device, and the wake-up device may be configured to wake up the waked-up device, and the waked-up device includes: a first wireless interface, configured to receive a power saving requirement and/or wake-up capability information of the wake-up device that are/is sent by the at least one wake-up device; a processor, configured to determine an operation mode of a second wireless interface of the first wireless device based on one or more of "a power saving requirement of the first wireless device, wake-up capability information of the first wireless device, a quantity of second wireless devices, the power saving requirement of the second wireless device, or the wake-up capability information of the second wireless device", where the operation mode includes a time synchronization mechanism and/or a sleep mode of the second wireless interface of the first wireless device; and the processor is further configured to configure the operation mode of the second wireless interface of the first wireless device after determining the operation mode of the second wireless interface of the first wireless device; and the second wireless interface, configured to: operate in the configured operation mode of the second wireless interface, receive a wake-up packet sent by the at least one wake-up device, and after receiving the wake-up packet sent by the at least one wake-up device, wake up the first wireless interface of the first wireless device, to perform message transmission with the wake-up device. The waked-up device provided in the present invention may determine the operation mode of the second wireless interface of the first wireless device based on one or more of "the power saving requirement of the first wireless device, the wake-up capability information of the first wireless device, the quantity of second wireless devices, the power saving requirement of the second wireless device, or the wake-up capability information of the second wireless device".

12. The waked-up device according to 11, where the first wireless interface of the first wireless device is further configured to send the power saving requirement and/or the wake-up capability information of the first wireless device to the at least one second wireless device. The first wireless device sends the power saving requirement and/or the wake-up capability information of the first wireless device to the second wireless device. This can help the second wireless device determine an operation mode of a second wireless interface of the second wireless device, and can also help the second wireless device determine the operation mode of the second wireless interface of the first wireless device.

13. The waked-up device according to 11, where the first wireless interface of the first wireless device is further configured to: after the processor determines the operation mode of the second wireless interface of the first wireless device, send the operation mode of the second wireless interface of the first wireless device to the at least one second wireless device. The first wireless device sends the operation mode of the second wireless interface of the first wireless device to the second wireless device. This can help the second wireless device select a correct wake-up operation to wake up the first wireless interface of the first wireless device. The "correct wake-up operation" includes a time at which the second wireless device sends a wake-up packet in an attempt to wake up the first wireless device, and a quantity of wake-up packets.

14. The waked-up device according to 13, where the first wireless interface of the first wireless device is further configured to: before the processor configures the operation mode of the second wireless interface of the first wireless device, receive a message sent by the at least one second wireless device, where the message includes an acknowledgement message of the second wireless device for the operation mode of the second wireless interface of the first wireless device, or includes an operation mode that is of the second wireless interface of the first wireless device and that is determined by the second wireless device. The operation mode that is of the second wireless interface of the first wireless device and that is determined by the first wireless device may be accepted by the second wireless device described above, the acknowledgement message of the second wireless device for the operation mode of the second wireless interface of the first wireless device is received); or may be rejected by the second wireless device, and the operation mode of the second wireless interface of the first wireless device may be finally determined by the second wireless device.

15. The waked-up device according to 14, where the first wireless interface of the first wireless device is further configured to: after the first wireless device receives the operation mode that is of the second wireless interface of the first wireless device and that is determined by the second wireless device, send an acknowledgement message for the operation mode of the second wireless interface of the first wireless device to the at least one second wireless device. When the operation mode of the second wireless interface of the first wireless device is determined by the second wireless device, the first wireless device sends the acknowledgement message to the second wireless device, to confirm that, the operation mode that is of the second wireless interface of the first wireless device and that is determined by the second wireless device is accepted.

16. The waked-up device according to any one of 11 to 15, where the processor is further configured to update the operation mode of the second wireless interface of the first wireless device when a wake-up requirement changes, where that the wake-up requirement changes includes: a quantity of second wireless devices connected to the first wireless device increases or decreases, or a power saving requirement and/or a wake-up capability of a second wireless device connected to the first wireless device change/changes. Based on a dynamic change of the wake-up requirement, the first wireless device dynamically updates the operation mode of the second wireless interface of the first wireless device, for example, the second wireless interface switches between two modes: "synchronous wake-up" and "asynchronous wake-up". Because there is a dynamic update operation, this technical solution of the present invention may be applicable to a plurality of application environments and satisfy power saving requirements of different devices.

17. The waked-up device according to any one of 11 to 16, where the processor may determine the operation mode of the second wireless interface of the first wireless device in the following manner:

when there is only one second wireless device and the second wireless device supports only the "asynchronous wake-up", or there is only one second wireless device and the second wireless device requires power saving, or there are at least two second wireless devices and the second wireless devices belong to different basic service sets (BSS) or belong to different networks, determining that the operation mode of the second wireless interface of the first wireless device is the "asynchronous wake-up"; or when there is only one second wireless device and the second wireless device supports only the "synchronous wake-up", or there is only one second wireless device and the second wireless device does not require power saving, or there are at least two second wireless devices and the second wireless devices belong to a same basic service set (BSS), determining that the operation mode of the second wireless interface of the first wireless device is the "synchronous wake-up". The first wireless device determines the operation mode of the second wireless interface of the first wireless device based on an actual operation scenario. This can effectively balance energy consumption of the first wireless device and the second wireless device, and avoid additional energy consumption and communication overheads that are brought by a complex time synchronization operation and time synchronization retention.

18. The waked-up device according to any one of 11 to 17, where the first wireless interface is an 802.11 interface, and the second wireless interface is an auxiliary wake-up interface.

It may be understood that, the main communications module in this specification may also be referred to as a first wireless interface, and the main communications module is a type of first wireless interface; and the auxiliary wake-up module in this specification may also be referred to as a second wireless interface, and the auxiliary wake-up module is a type of second wireless interface.

DESCRIPTION OF EMBODIMENTS

Embodiments of this application may be applied to an Internet of Things scenario in which a first wireless device wakes up a second wireless device based on Wi-Fi, for example, may be applied to a scenario in which a first wireless device wakes up a second wireless device based on a wearable network including a wearable device and a wireless device. The embodiments of this application may also be applied to another scenario of waking up a wireless device. This is not limited in this application. Small-capacity batteries may be used to supply power to the first wireless device and the second wireless device, or the first wireless device and the second wireless device may require ultra-low power consumption and a long standby time.

A system architecture applied to the embodiments of the present invention may include a first wireless device and a second wireless device. The first wireless device may be a waked-up device; may be specifically a personal computer (Personal Computer, PC), a mobile phone, a tablet computer (pad), a smart learning machine, a smart game console, a smart television, smart glasses, a smartwatch, or the like; and may be configured to receive indication information sent by the second wireless device, and set an operation mode of an auxiliary wake-up module of the first wireless device based on a quantity of second wireless devices and the indication information. The second wireless device may be a wake-up device; may be specifically a router, a mobile phone in a hotspot mode, or another device or apparatus that may be used for communication on the Internet of Things; and is configured to send the indication information to the first wireless device. It should be noted that, when the first wireless device and the second wireless device each have an auxiliary wake-up module, both the first wireless device and the second wireless device may be wake-up devices, or may be waked-up devices. The auxiliary wake-up module may also be referred to as a wake-up receiving module. For example, if a mobile phone is associated with a smartwatch, and the mobile phone and the smartwatch each have an auxiliary wake-up module, when the mobile phone needs to set an operation mode of an auxiliary wake-up module of the mobile phone, the mobile phone is a waked-up device, and the smartwatch is a wake-up device; contrarily, when the smartwatch needs to set an operation mode of an auxiliary wake-up module of the smartwatch, the smartwatch is a waked-up device, and the mobile phone is a wake-up device.

Figure 4:
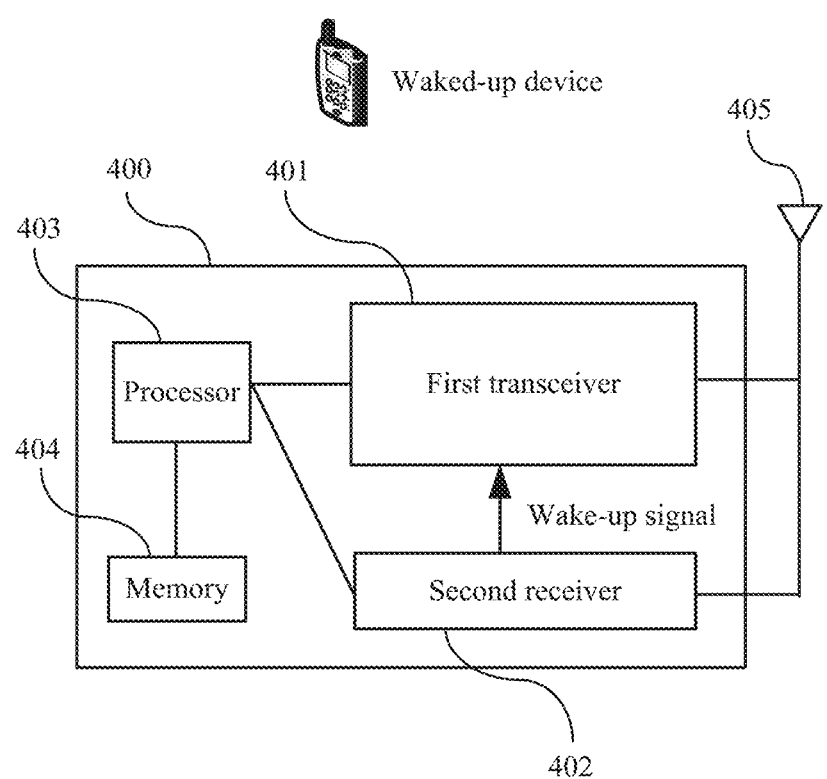
FIG. 4 is an internal structural diagram of a waked-up device according to an embodiment of the present invention.

FIG. 4 is a schematic internal structural diagram of a first wireless device according to an embodiment of the present invention. In the present invention, the first wireless device, namely, a waked-up device 400, may include a first transceiver 401, a second receiver 402, a processor 403, a memory 404, and an antenna submodule 405. The first transceiver 401 is configured to receive, in a communication manner such as Long Term Evolution (Long Term Evolution, LTE) or Wi-Fi, an instruction sent by another device; or may send data of the first wireless device to another device. The second receiver 402 is configured to: receive, by using a receiving technology with ultra-low power consumption, a wake-up packet sent by a wake-up device; and after receiving the wake-up packet, send a wake-up signal to the first wireless interface, to wake up the first wireless interface of the waked-up device. The processor 403 is configured to control various parts of hardware apparatuses, application program software, and the like of the first wireless device. The memory 404 is configured to perform software program storage, data storage, and software running for the first wireless device. The antenna submodule may be configured to receive, by using a wireless receiving technology, the wake-up packet sent by the wake-up device, and the like. In addition, to reduce device hardware costs and achieve simple implementation, the first wireless interface 401 and the second wireless interface 402 may share one antenna submodule 405. Alternatively, the first wireless interface 401 and the second wireless interface 402 may be corresponding to different antennas, especially when the first wireless interface 401 and the second wireless interface 402 operate on different frequency bands. In an actual product, the waked-up device 400 may be implemented by a system on chip (SoC), or may be jointly implemented by one or more integrated circuits.

The following describes the embodiments of the present invention by using an example in which the first wireless device is a waked-up device, and the second wireless device is a wake-up device. In the embodiments of this application, the waked-up device may receive indication information sent by at least one wake-up device. Then the waked-up device may determine an operation mode of an auxiliary wake-up module of the waked-up device based on a quantity of wake-up devices and/or the indication information, where the operation mode may include a time synchronization mechanism and/or a sleep mode. Then the waked-up device notifies the wake-up device of the operation mode, so that the wake-up device may send, based on the operation mode, a wake-up packet to the auxiliary wake-up module of the waked-up device. After receiving the wake-up packet, the auxiliary wake-up module of the waked-up device may wake up a main communications module of the waked-up device. Then the main communications module of the waked-up device may communicate with the wake-up device.

Figure 5:
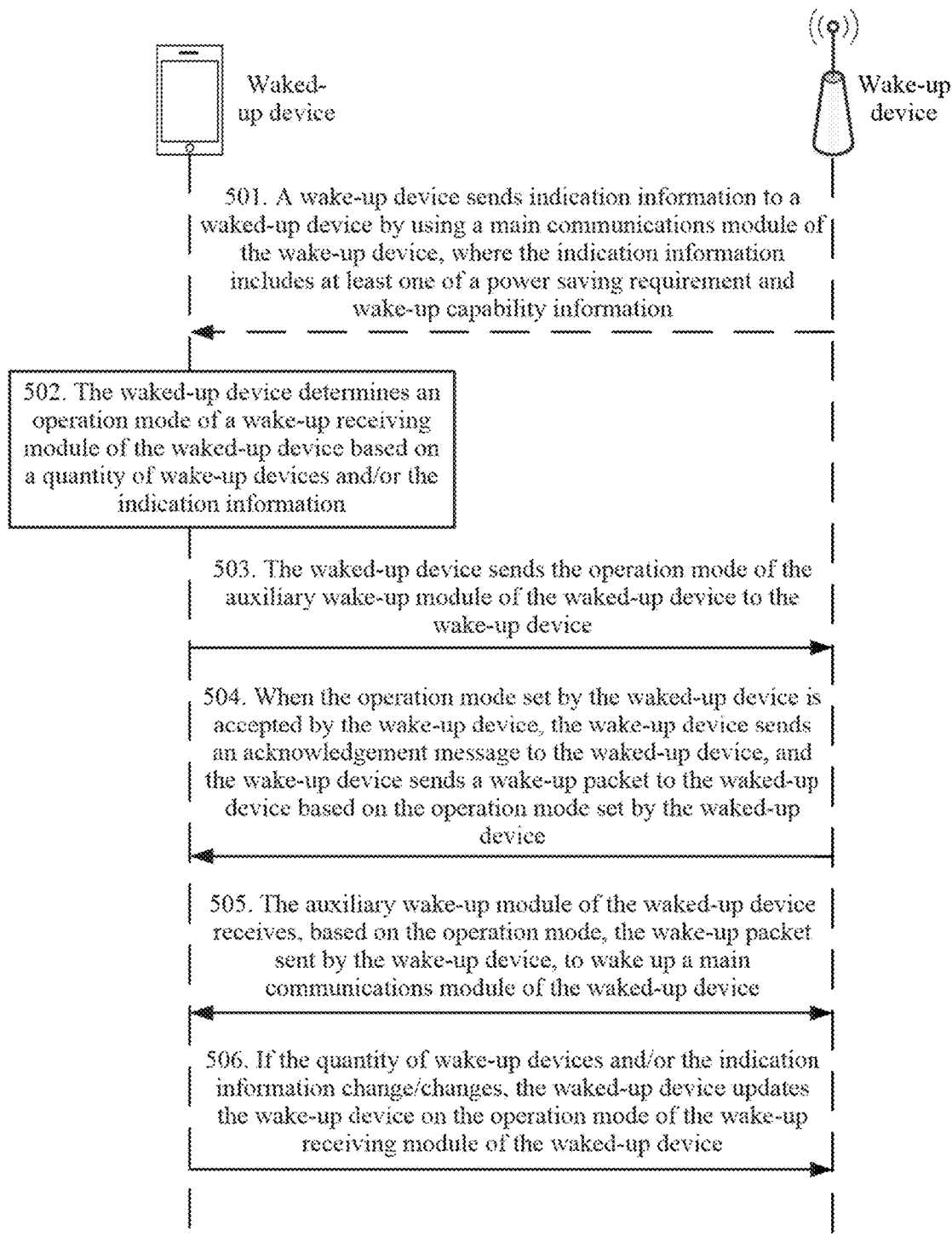
FIG. 5 is a schematic diagram of a method for waking up a wireless device according to an embodiment of the present invention.

An embodiment of this application provides a method for waking up a wireless device, as shown in FIG. 5.

501. A wake-up device sends indication information of the wake-up device to a waked-up device by using a main communications module of the wake-up device, where the indication information includes at least one of a power saving requirement or wake-up capability information.

When or after being associated with the wake-up device, the waked-up device may receive, by using a main communications module of the waked-up device, a beacon frame (Beacon Frame) or a public action frame (Public Action Frame) sent by the wake-up device, to obtain the power saving requirement and/or the wake-up capability information of the wake-up device. The main communications module may be a Bluetooth module or a Wi-Fi communications module, may be a cellular mobile communications module, or the like. This is not limited in this embodiment of this application.

Figure 5A:
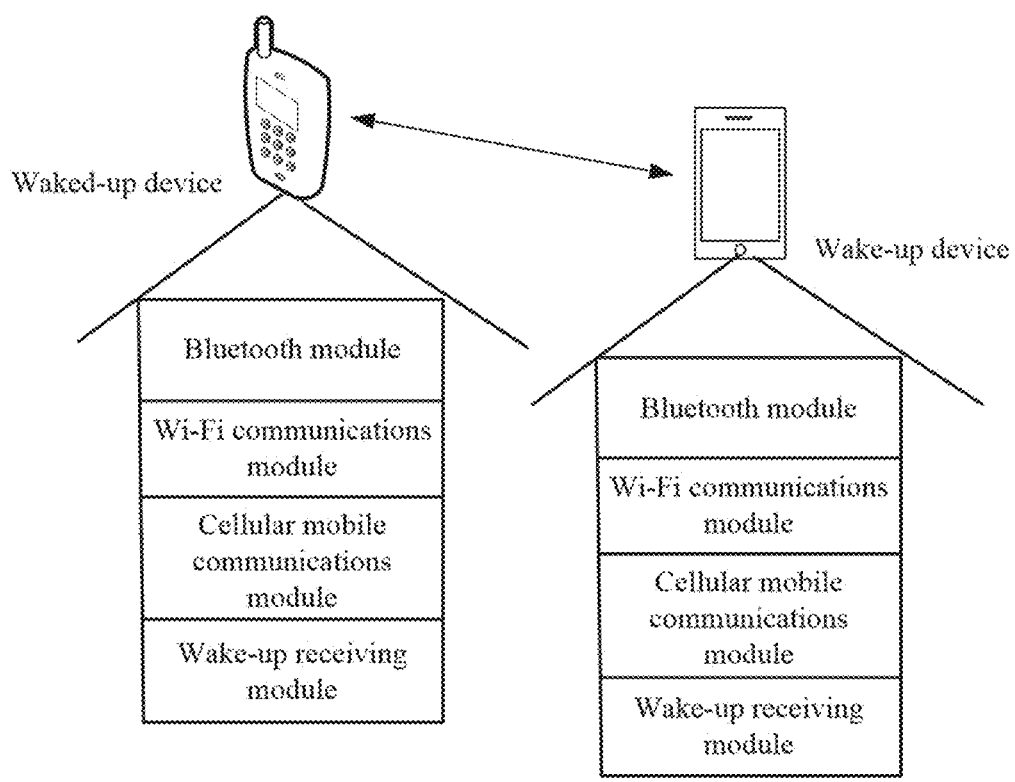
FIG. 5a is a schematic diagram of internal modules of a waked-up device and a wake-up device according to an embodiment of the present invention.

For example, as shown in FIG. 5a, the waked-up device and the wake-up device each may have an auxiliary wake-up module, a Bluetooth module, a Wi-Fi communications module, or a cellular mobile communications module. When the waked-up device is associated with the wake-up device, the waked-up device may receive, by using a Bluetooth module, a Wi-Fi communications module, or a cellular mobile communications module of the waked-up device, a beacon frame, a probe response frame, an association response frame, a reassociation response frame, or a public action frame that is sent by the wake-up device, so as to obtain the power saving requirement and/or the wake-up capability information of the wake-up device.

In a possible design, the waked-up device may send a probe request frame (Probe Request Frame) to the wake-up device, and obtain the power saving requirement and/or the wake-up capability information of the wake-up device by using a probe response frame (Probe Response Frame) fed back by the wake-up device.

In a possible design, the waked-up device may send an association request frame (Association Request Frame) to the wake-up device, and obtain the power saving requirement and/or the wake-up capability information of the wake-up device by using an association response frame (Association Response Frame) fed back by the wake-up device.

In a possible design, the waked-up device may send a reassociation request frame (Reassociation Request Frame) to the wake-up device, and obtain the power saving requirement and/or the wake-up capability information of the wake-up device by using a reassociation response frame (Reassociation Response Frame) fed hack by the wake-up device.

The power saving requirement of the wake-up device is used to represent that the wake-up device requires power saving or does not require power saving, and may be indicated by power supply information of the wake-up device. For example, if the power supply information is active power supply, the power saving requirement of the wake-up device is that power saving is not required; or if the power supply information is battery powered, the power saving requirement of the wake-up device is that power saving is required. Alternatively, the power saving requirement of the wake-up device may be indicated by whether the wake-up device has an auxiliary wake-up module. For example, if the wake-up device has an auxiliary wake-up module, the power saving requirement of the wake-up device is that power saving is required; or if the wake-up device has no auxiliary wake-up module, the power saving requirement of the wake-up device is that power saving is not required. Alternatively, the power saving requirement of the wake-up device may be indicated by sleep information of the main communications module (for example, a Wi-Fi communications module). For example, if the main communications module needs to sleep, the power saving requirement of the wake-up device is that power saving is required; or if the main communications module does not need to sleep, the power saving requirement of the wake-up device is that power saving is not required. A person skilled in the art may understand that, whether the main communications module of the wake-up device needs to sleep may be determined based on a duty-cycling (Duty-Cycling) period and a wake time length of the main communications module of the wake-up device.

The wake-up capability information of the wake-up device is used to indicate that the wake-up device supports synchronous wake-up and/or asynchronous wake-up. In addition, the wake-up capability information of the wake-up device may be further used to represent whether an operating channel of an auxiliary wake-up module of the waked-up device is supported, whether sending a wake-up packet to the waked-up device is supported, and the like. The wake-up capability information of the wake-up device may further include information about the auxiliary wake-up module of the wake-up device, and function information (for example, a processing capability) and an operating channel of the auxiliary wake-up module of the wake-up device.

Alternatively, the waked-up device may obtain the power saving requirement and/or the wake-up capability information of the wake-up device through user configuration, such as manual input configuration or two-dimensional code scanning.

It should be noted that the power saving requirement and/or the wake-up capability information of the wake-up device may be transmitted by extending a vendor specific information element (Vendor Specific IE) in an existing message, or may be transmitted by adding a new information element (Information Element, IE) to an existing message.

502. The waked-up device determines an operation mode of an auxiliary wake-up module of the waked-up device based on a quantity of wake-up devices and/or the indication information.

The operation mode includes a time synchronization mechanism and/or a sleep mode of the auxiliary wake-up module.

For the time synchronization mechanism of the auxiliary wake-up module of the waked-up device, the waked-up device may determine the time synchronization mechanism of the auxiliary wake-up module of the waked-up device based on a priority relationship between at least two of the following three parameters: the quantity of wake-up devices, the power saving requirement of the wake-up device, and the wake-up capability information of the wake-up device. For example, priority information of the quantity of wake-up devices, the power saving requirement of the wake-up device, and the wake-up capability information of the wakeup device may be: A priority of the wake-up capability information of the wake-up device is higher than the priority of the quantity of the wake-up devices, and the priority of the quantity of wake-up devices is higher than the priority of the power saving requirement.

For example, it is assumed that the waked-up device obtains all of the quantity of wake-up devices, the power saving requirement of the wake-up device, and the wake-up capability information of the wake-up device, or the waked-up device obtains both the quantity of wake-up devices and the wake-up capability information of the wake-up device. Because the priority of the wake-up capability information of the wake-up device is highest, the waked-up device may determine the time synchronization mechanism of the auxiliary wake-up module of the waked-up device based on the wake-up capability information of the wake-up device.

For example, if the wake-up capability information of the wake-up device indicates that the wake-up device supports only synchronous wake-up, the waked-up device sets that the auxiliary wake-up module of the waked-up device needs to stay time-synchronized with the wake-up device, that is, sets the time synchronization mechanism of the auxiliary wake-up module of the waked-up device to synchronous wake-up; the wake-up device periodically sends time synchronization frames to the auxiliary wake-up module of the waked-up device and the auxiliary wake-up module of the waked-up device periodically receives the time synchronization frames sent by the wake-up device. Alternatively, if the wake-up capability information of the wake-up device indicates that the wake-up device supports only asynchronous wake-up, the waked-up device may set that the auxiliary wake-up module of the waked-up device does not need to stay time-synchronized with the wake-up device, that is, the wake-up device does not send a time synchronization frame to the auxiliary wake-up module of the waked-up device, or the waked-up device does not receive a time synchronization frame sent by the wake-up device, that is, the time synchronization mechanism of the auxiliary wake-up module of the waked-up device is set to asynchronous wake-up.

Similarly, if the waked-up device obtains both the quantity of wake-up devices and the power saving requirement of the wake-up device, because the priority of the quantity of wake-up devices is higher than the priority of the power saving requirement of the wake-up device, the waked-up device determines the time synchronization mechanism of the auxiliary wake-up module of the waked-up device based on the quantity of wake-up devices. Specifically, if the quantity of wake-up devices is greater than or equal to 2 and the wake-up devices belong to different basic service sets, the auxiliary wake-up module of the waked-up device is set not to be time-synchronized with the wake-up devices. When the quantity of wake-up devices is equal to 1, or the quantity of wake-up devices is greater than or equal to 2 and the wake-up devices belong to a same basic service set, the waked-up device may further set the time synchronization mechanism of the auxiliary wake-up module based on the power saving requirement of the wake-up device, that is, if it is determined that the power saving requirement represents that the wake-up device requires power saving, the waked-up device sets the auxiliary wake-up module of the waked-up device not to be time-synchronized with the wake-up device; or if it is determined that the power saving requirement represents that the wake-up device does not require power saving, the waked-up device sets the auxiliary wake-up module of the waked-up device to be time-synchronized with the wake-up device.

Certainly, when the indication information obtained by the waked-up device includes the wake-up capability information of the wake-up device, and the waked-up device also obtains the quantity of wake-up devices, according to the priority relationship, the waked-up device also determines the time synchronization mechanism of the auxiliary wake-up module of the waked-up device based on the wake-up capability information of the wake-up device, that is, if the wake-up capability information of the wake-up device indicates that the wake-up device supports synchronous wake-up, the waked-up device sets the auxiliary wake-up module of the waked-up device to be time-synchronized with the wake-up device; or if the wake-up capability information of the wake-up device indicates that the wake-up device supports asynchronous wake-up, the waked-up device may set the auxiliary wake-up module of the waked-up device not to be time-synchronized with the wake-up device.

Alternatively, when the waked-up device determines the time synchronization mechanism of the auxiliary wake-up module based on the power saving requirement and the wake-up capability information in the indication information, the waked-up device also determines the time synchronization mechanism of the auxiliary wake-up module based on the wake-up capability information.

It should be noted that, if the waked-up device currently stays time-synchronized with the wake-up device, and the waked-up device determines that the auxiliary wake-up module of the waked-up device needs to be set to be synchronized with the wake-up device, the waked-up device may not need to set the time synchronization mechanism of the auxiliary wake-up module of the waked-up device. Similarly, if the waked-up device currently stays time-synchronized with the wake-up device, and the waked-up device determines that the auxiliary wake-up module of the waked-up device needs to be set not to be synchronized with the wake-up device, the waked-up device sets the auxiliary wake-up module of the waked-up device not to be synchronized with the wake-up device. Likewise, if the waked-up device currently does not stay time-synchronized with the wake-up device, and the waked-up device determines that the auxiliary wake-up module of the waked-up device does not need to be set to be synchronized with the wake-up device, the waked-up device may not need to set the time synchronization mechanism of the auxiliary wake-up module of the waked-up device. Similarly, if the waked-up device currently does not stay time-synchronized with the wake-up device, and the waked-up device determines that the auxiliary wake-up module of the waked-up device needs to be set to be synchronized with the wake-up device, the waked-up device sets the auxiliary wake-up module of the waked-up device to be synchronized with the wake-up device. Alternatively, if the waked-up device does not determine the time synchronization mechanism of the auxiliary wake-up module of the waked-up device, the waked-up device sets the time synchronization mechanism of the auxiliary wake-up module of the waked-up device based on the wake-up capability information of the wake-up device. For a specific setting manner, refer to the foregoing descriptions.

When the waked-up device sets the sleep mode in the operation mode of the auxiliary wake-up module, the sleep mode includes a duty-cycling period and a wake window length of the auxiliary wake-up module.

That the waked-up device sets the sleep mode of the auxiliary wake-up module may be setting the duty-cycling (Duty-Cycling) period T and the wake window length W of the auxiliary wake-up module of the waked-up device, for example, setting T to 100 milliseconds and W to 2 milliseconds; or may be setting the duty-cycling period T and a wake time proportion ρ of the auxiliary wake-up module of the waked-up device, for example, setting T to 100 milliseconds and ρ to 2% or may be setting the duty-cycling period T and a sleep time proportion λ of the auxiliary wake-up module of the waked-up device, for example, setting T to 100 ms and λ to 98%.

When the waked-up device determines the quantity of wake-up devices, and the received indication information includes the wake-up capability information of the wake-up device, or the indication information includes the wake-up capability information and the power saving requirement of the wake-up device; or when the waked-up device determines only the wake-up capability information of the wake-up device, according to the priority relationship, the waked-up device determines the sleep mode of the auxiliary wake-up module of the waked-up device based on the wake-up capability information of the wake-up device.

For example, when the time synchronization mechanism is an asynchronous mechanism, the wake window length of duty-cycling of the auxiliary wake-up module of the waked-up device may be set to a relatively long time. For example, the duty-cycling period may be 100 milliseconds, and the wake window length is 10 milliseconds, so that the wake-up device can wake up a plurality of waked-up devices. When the time synchronization mechanism is a synchronous mechanism, the wake window length of duty-cycling of the auxiliary wake-up module of the waked-up device may be set to a relatively short time. For example, the duty-cycling period may be 100 milliseconds, and the wake window length is 2 milliseconds, so as to save power for the waked-up device.

When the waked-up device determines only the quantity of wake-up devices, or determines the quantity of wake-up devices and the power saving requirement, according to the priority relationship, the waked-up device determines the sleep mode of the auxiliary wake-up module based on the quantity of wake-up devices.

For example, if a quantity of wake-up devices, among the wake-up devices, that belong to a same basic service set is equal to 1, the waked-up device may set the period T and the wake window length W of the auxiliary wake-up module of the waked-up device to 100 milliseconds and 2 milliseconds respectively, that is, the wake window length is relatively small, so as to save power for the waked-up device. When a quantity of wake-up devices, among the wake-up devices, that belong to a same basic service set is relatively large, for example, is 2, the period T and the wake window length W of the auxiliary wake-up module of the waked-up device may be set to 100 milliseconds and 2×2=4 milliseconds respectively, where the wake window length is relatively large, so that the waked-up device receives wake-up packets from the two wake-up devices.

For example, when the waked-up device determines only the power saving requirement of the wake-up device, if the power saving requirement indicates that power saving is required, the waked-up device determines that the period T and the wake window length W of the auxiliary wake-up module are 100 milliseconds and 2 milliseconds respectively, that is, the wake window length is relatively small, so as to save power for the waked-up device; or if the power saving requirement indicates that power saving is not required, the waked-up device determines that the period T and the wake window length W of the auxiliary wake-up module are 100 milliseconds and 10 milliseconds respectively, that is, the wake window length is relatively large.

After the waked-up device determines the duty-cycling period and the wake window length of the auxiliary wake-up module, if the auxiliary wake-up module of the waked-up device needs to stay time-synchronized with the wake-up device, the wake-up device may periodically send auxiliary wake-up module time synchronization frames to the auxiliary wake-up module of the waked-up device, for example, send a time synchronization frame every 10 s, to ensure that the wake-up device can accurately know locations, on a time axis, of a wake time point and a wake window of the auxiliary wake-up module of the waked-up device. When the waked-up device needs to communicate with the wake-up device, that is, the wake-up device needs to wake up the main communications module of the waked-up device, the wake-up device may send n wake-up packets to the auxiliary wake-up module of the waked-up device in the wake window of the auxiliary wake-up module of the waked-up device. n is greater than or equal to 1.

If the auxiliary wake-up module of the waked-up device does not need to stay time-synchronized with the wake-up device, because the wake-up device does not know the locations, on the time axis, of the wake time point and the wake window of the auxiliary wake-up module of the waked-up device, the wake-up device may consecutively send n wake-up packets to the auxiliary wake-up module of the waked-up device, and at least one wake-up packet is expected to be received by the auxiliary wake-up module of the waked-up device. n is greater than or equal to 2.

Figure 5B:
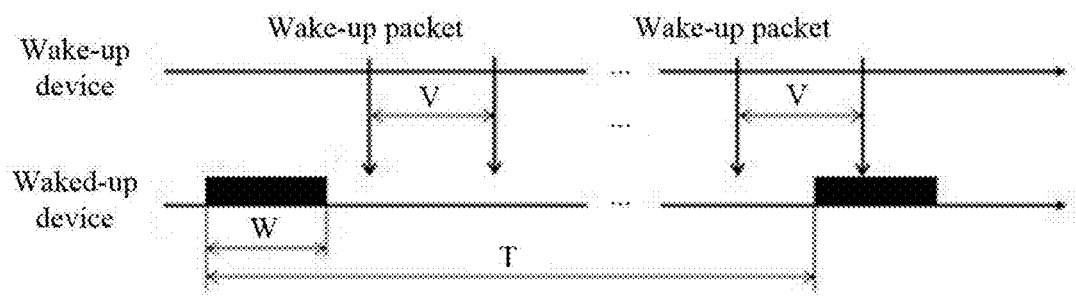
FIG. 5b is a schematic diagram of sending timing of a wake-up packet according to an embodiment of the present invention.

Specifically, a time interval between the n wake-up packets consecutively sent by the wake-up device is less than the wake window length W. As shown in FIG. 5b, a length of a time interval between two adjacent wake-up packets sent by the wake-up device is V, the wake window length of the auxiliary wake-up module of the waked-up device is W, and the period of the auxiliary wake-up module of the waked-up device is T. n is greater than or equal to T/V. Because of a delay and randomness caused by channel contention, a time interval at which the wake-up device consecutively sends two wake-up packets is random, that is, the parameter V is random. Therefore, it needs to be ensured that V≤W, to expect that at least one of the n sent wake-up packets falls within the wake window of the auxiliary wake-up module of the waked-up device, and the wake-up packet can be received by the auxiliary wake-up module of the waked-up device, so as to wake up the main communications module of the waked-up device.

503. The waked-up device sends the operation mode of the auxiliary wake-up module of the waked-up device to the wake-up device.

The waked-up device may notify the connected wake-up device of the operation mode of the auxiliary wake-up module during or after association. Specifically, when the wake-up device sends the operation mode of the auxiliary wake-up module of the waked-up device, the waked-up device may send the operation mode to the wake-up device before the waked-up device performs setting, or may send the operation mode to the wake-up device when the waked-up device is performing setting, or may send the operation mode to the wake-up device after the waked-up device completes setting. This is not limited in this application.

Specifically, the waked-up device may notify the wake-up device of the operation mode of the auxiliary wake-up module of the waked-up device by sending an association request frame (Association Request Frame), a reassociation request frame (Reassociation Request Frame), or a public action frame (Public Action Frame) to the wake-up device.

504. When the operation mode set by the waked-up device is accepted by the wake-up device, the wake-up device sends an acknowledgement message to the waked-up device, and the wake-up device sends a wake-up packet to the waked-up device based on the operation mode set by the waked-up device.

The waked-up device may obtain, by receiving an association response frame (Association Response Frame), a reassociation response frame (Reassociation Response Frame), or a public action frame (Public Action Frame) sent by the wake-up device, the acknowledgement message sent by the wake-up device. If the waked-up device receives the acknowledgement information sent by the wake-up device, it indicates that the operation mode of the waked-up device is accepted by the wake-up device, and the waked-up device may receive the wake-up packet that is sent by the wake-up device based on the confirmed operation mode.

For example, if the time synchronization mechanism of the operation mode of the waked-up device received by the wake-up device is asynchronous wake-up, and in the sleep mode, the period T and the wake window length W are 100 milliseconds and 2 milliseconds respectively, the waked-up device receives n consecutive wake-up packets sent by the wake-up device, where a time interval V between the n consecutive wake-up packets should not exceed 2 milliseconds, and n=T/V.

505. The auxiliary wake-up module of the waked-up device receives, based on the operation mode, the wake-up packet sent by the wake-up device, to wake up a main communications module of the waked-up device.

After the auxiliary wake-up module of the waked-up device receives the wake-up packet sent by the wake-up device, the auxiliary wake-up module of the waked-up device sends a wake-up signal to the main communications module of the waked-up device. After the main communications module is waked up by the wake-up signal, the waked-up device may communicate with the wake-up device by using the main communications module that is waked up.

506. If the quantity of wake-up devices and/or the indication information change/changes, the waked-up device updates the operation mode of the auxiliary wake-up module of the waked-up device to the wake-up device.

Figure 5C:
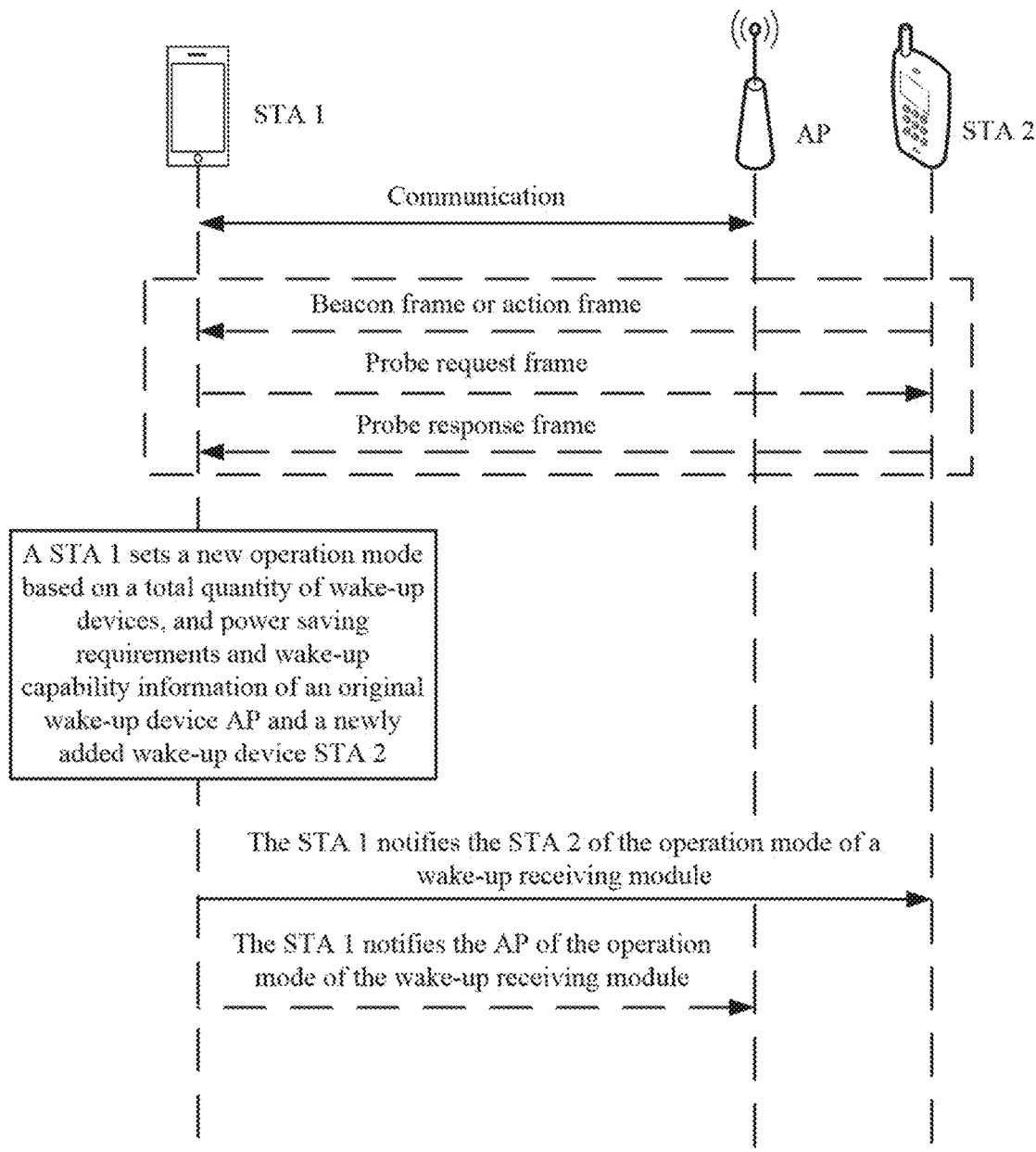
FIG. 5c is a signal flowchart of waking up a wireless device according to an embodiment of the present invention.

For example, as shown in FIG. 5c, it is assumed that a STA 1 is a waked-up device, an AP is a wake-up device, and a STA 2 is a newly added wake-up device. When the STA 1 communicates only with the AP, an operation mode of an auxiliary wake-up module of the STA 1 is: A time synchronization mechanism is synchronous wake-up, and in a sleep mode, T=100 milliseconds, and W=2 milliseconds. When the new wake-up device STA 2 needs to communicate with the STA 1, the STA 1 receives a beacon frame, a probe response frame, an association response frame, a reassociation response frame, or a public action frame that is sent by the STA 2 and that carries power saving information and/or wake-up capability information of the STA 2. Alternatively, the STA 1 may send a probe request to the STA 2, and after receiving the probe request, the STA 2 sends, to the STA 1, a probe response carrying power saving information and/or wake-up capability information of the STA 2. The STA 1 sets a new operation mode based on a total quantity of wake-up devices, and power saving requirements and wake-up capability information of the original wake-up device AP and the newly added wake-up device STA 2. If the newly specified operation mode of an auxiliary wake-up module is: a time synchronization mechanism is asynchronous wake-up, and in a sleep mode, T=100 milliseconds, and W=4 milliseconds, the STA 1 notifies the original wake-up device AP and the newly added wake-up device STA 2 of the new operation mode. Alternatively, if the newly specified operation mode of an auxiliary wake-up module is: a time synchronization mechanism is synchronous wake-up, and in a sleep mode, T=100 milliseconds, and W=2 milliseconds, the STA 1 notifies only the newly added wake-up device STA 2 of the newly specified operation mode. Because the newly specified operation mode is consistent with the operation mode in which the STA 1 communicates only with the AP, the original wake-up device AP does not need to be notified. In addition, after a period of time, when the STA 2 is referred to as a waked-up device, and the STA 1 is a wake-up device, if the STA 1 has sent a power saving requirement and wake-up capability information to the STA 2 when the STA 1 is associated with the STA 2 for the first time, the STA 1 does not need to resend the power saving requirement and/or the wake-up capability information of the STA 1 to the STA 2, and the STA 2 may set an operation mode of the STA 2 based on the previously sent information.

In addition, when the waked-up device simultaneously communicates with a plurality of wake-up devices, the waked-up device may have a plurality of Wi-Fi communications modules that can operate simultaneously, and the plurality of Wi-Fi communications modules separately operate on a plurality of frequency bands. For example, the waked-up device may have two Wi-Fi communications modules that can operate simultaneously, and the two Wi-Fi communications modules separately operate at 2.4 GHz and 5 GHz. The waked-up device may communicate with a wake-up device 1 by using the 5-GHz Wi-Fi communications module, and communicate with a wake-up device 2 using the 2.4-GHz Wi-Fi communications module.

It can be learned that, according to the method for waking up a wireless device in this embodiment of this application, the waked-up device may set the operation mode of the auxiliary wake-up module of the waked-up device based on the quantity of wake-up devices and/or the indication information, where the operation mode includes the time synchronization mechanism and/or the sleep mode, and the time synchronization mechanism may be synchronous wake-up or asynchronous wake-up. However, in the prior art, a time synchronization mechanism of an auxiliary wake-up module of a waked-up device may be only synchronous wake-up. When the waked-up device is connected to a plurality of different wake-up devices, the auxiliary wake-up module of the waked-up device needs to maintain a plurality of pieces of clock information, and needs to periodically receive time synchronization frames from the plurality of wake-up devices. This significantly increases complexity and power consumption of the auxiliary wake-up module of the waked-up device, and reduces a standby time of a battery of the waked-up device. In addition, the plurality of wake-up devices separately send the time synchronization frames, thereby wasting a large quantity of air-interface time-frequency resources. Compared with that in the prior art, in an asynchronous mode, clock information does not need to be maintained, and no time synchronization frame needs to be received from a wake-up device. This can resolve a problem that additional energy consumption and communication overheads that are brought by time synchronization retention between a wake-up device and a waked-up device are large.

Figure 6:
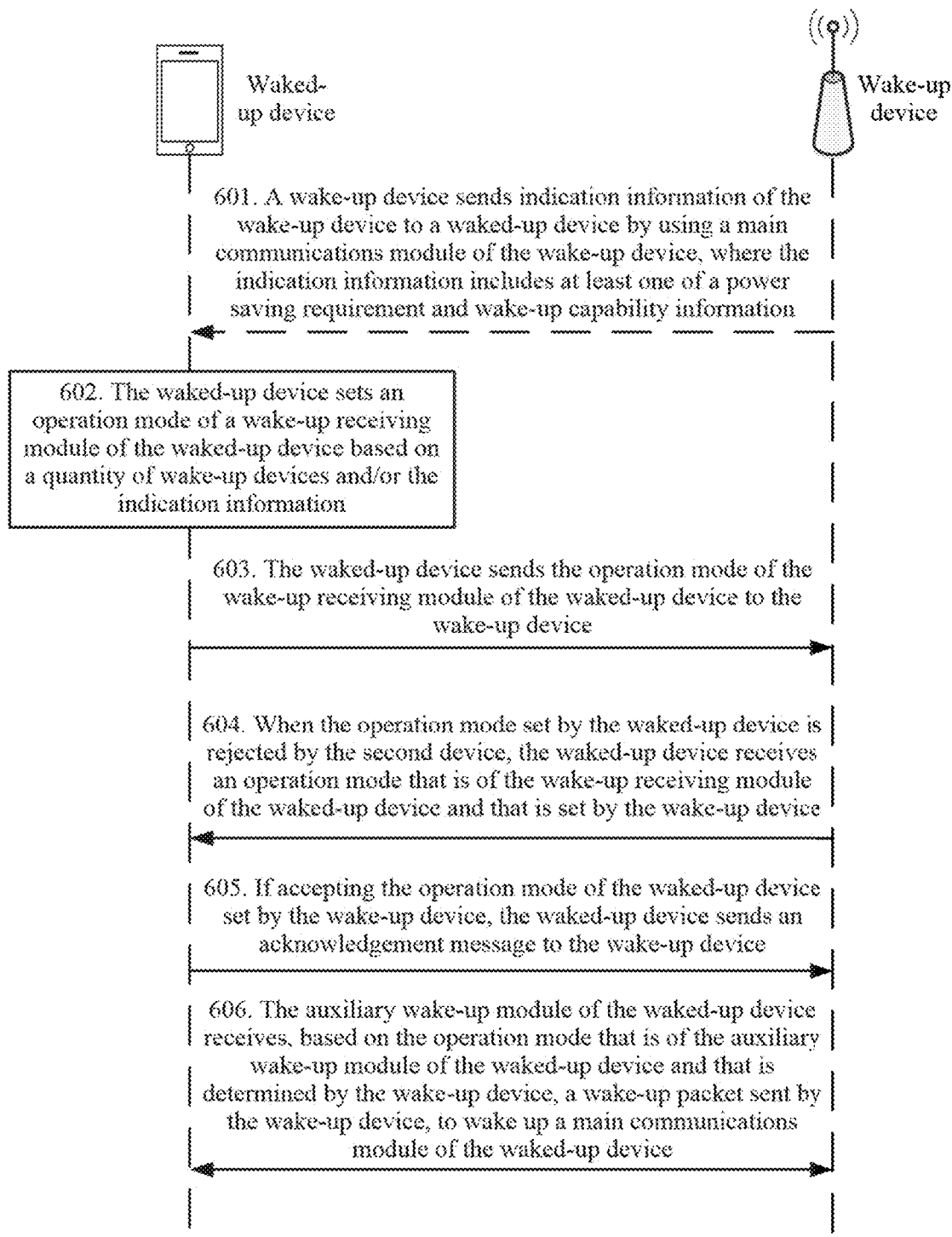
FIG. 6 is a schematic diagram of a method for waking up a wireless device according to an embodiment of the present invention.

An embodiment of this application provides a method for waking up a wireless device, as shown in FIG. 6.

601. A wake-up device sends indication information of the wake-up device to a waked-up device by using a main communications module of the wake-up device, where the indication information includes at least one of a power saving requirement or wake-up capability information.

For an implementation of step 601, refer to step 501.

602. The waked-up device determines an operation mode of an auxiliary wake-up module of the waked-up device based on a quantity of wake-up devices and/or the indication information.

For a specific setting process, refer to step 502.

603. The waked-up device sends the operation mode of the auxiliary wake-up module of the waked-up device to the wake-up device.

604. When the operation mode set by the waked-up device is rejected by the second device, the waked-up device receives an operation mode that is of the auxiliary wake-up module of the waked-up device and that is set by the wake-up device.

In a possible case, a reason why the wake-up device rejects the operation mode set by the waked-up device is: The power saving requirement and/or the wake-up capability information of the wake-up device change/changes temporarily, and become/becomes different from the power saving requirement and/or the wake-up capability information that are/is sent to the waked-up device. As a result, the operation mode that is of the auxiliary wake-up module of the waked-up device and that is set by the waked-up device is rejected by the wake-up device.

When an operation mode that is of an auxiliary wake-up module of a waked-up device 1 and that is set by the waked-up device is rejected by the wake-up device, the wake-up device may set an operation mode of the auxiliary wake-up module of the waked-up device based on the power saving requirement and/or the wake-up capability information of the wake-up device. If the wake-up device is also associated with another waked-up device, for example, the wake-up device is also associated with a waked-up device 2 and a waked-up device 3, the wake-up device may set the operation mode of the auxiliary wake-up module of the waked-up device 1 based on a quantity of associated waked-up devices.

In another possible case, the waked-up device is incapable of setting the operation mode of the auxiliary wake-up module of the waked-up device. Therefore, the wake-up device may set the operation mode of the auxiliary wake-up module of the waked-up device.

605. If accepting the operation mode of the waked-up device set by the wake-up device, the waked-up device sends an acknowledgement message to the wake-up device.

Alternatively, if the waked-up device rejects the operation mode that is of the auxiliary wake-up module of the waked-up device and that is set by the wake-up device, the wake-up device may set the operation mode of the auxiliary wake-up module of the waked-up device again.

606. The auxiliary wake-up module of the waked-up device receives, based on the operation mode that is of the auxiliary wake-up module of the waked-up device and that is determined by the wake-up device, a wake-up packet sent by the wake-up device, to wake up a main communications module of the waked-up device.

When the waked-up device accepts the operation mode that is of the auxiliary wake-up module of the waked-up device and that is set by the wake-up device, the waked-up device receives the wake-up packet that is sent by the wake-up device based on the operation mode.

In this way, if the operation mode that is of the auxiliary wake-up module of the waked-up device and that is set by the waked-up device based on the wake-up capability information of the wake-up device, the quantity of wake-up devices, and the power saving requirement of the wake-up device is rejected by the wake-up device, the wake-up device may set the operation mode of the auxiliary wake-up module of the waked-up device. The operation mode includes a time synchronization mechanism and/or a sleep mode. The time synchronization mechanism may be synchronous wake-up or asynchronous wake-up. In the prior art, when a time synchronization mechanism of an auxiliary wake-up module of a waked-up device is synchronous wake-up, a plurality of pieces of clock information need to be maintained, and time synchronization frames need to be periodically received from a plurality of wake-up devices. In comparison, in this embodiment of this application, during asynchronous wake-up, there is no need to maintain a plurality of pieces of clock information or receive time synchronization frames from a plurality of wake-up devices. This can resolve a problem that additional energy consumption and communication overheads of a wake-up device and a waked-up device are large.

The foregoing describes the solutions provided in the embodiments of the present invention mainly from a perspective of a first wireless device, namely, the waked-up device. It may be understood that, to implement the foregoing functions, the first wireless device includes corresponding hardware structures and/or software modules for executing the functions. A person skilled in the art should easily be aware that algorithm steps described with reference to the embodiments disclosed in this specification may be implemented by hardware or a combination of hardware and computer software in the present invention. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the present invention.

In the embodiments of the present invention, function modules of the first wireless device may be divided according to the foregoing method examples. For example, the function modules may be divided based on the functions, or at least two functions may be integrated in one processing module. The integrated module may be implemented in a form of hardware, or may be implemented in a form of a software function module. It should be noted that the unit division in the embodiments of the present invention is an example, is merely logical function division, and may be other division in actual implementation.

Figure 7:
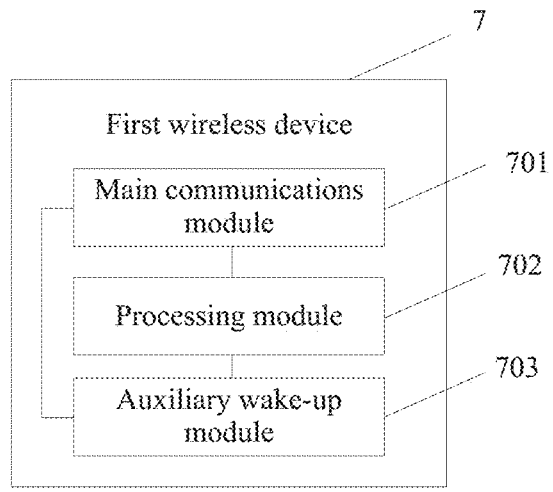
FIG. 7 is a schematic structural diagram of a first wireless device according to an embodiment of the present invention.

When the function modules are divided based on the functions, FIG. 7 shows a possible schematic structural diagram of the first wireless device 7 in the foregoing embodiments. The first wireless device includes a main communications module 701, a processing module 702, and an auxiliary wake-up module 703. The main communications module 701 is configured to support the first wireless device in performing processes 501, 503, 504, and 505 in FIG. 5, and processes 601, 603, 604, and 605 in FIG. 6. The processing module 702 is configured to support the first wireless device in performing processes 502 and 506 in FIG. 5, and processes 602 and 607 in FIG. 6. The auxiliary wake-up module 703 is configured to support the first wireless device in performing process 606 in FIG. 6. For function descriptions of the corresponding function modules, refer to all related content of the steps in the foregoing method embodiments. Details are not described herein again.

Figure 8:
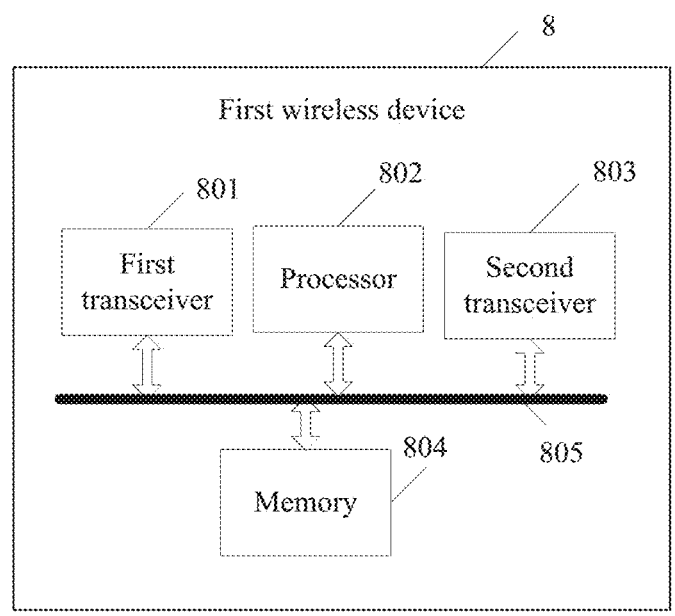
FIG. 8 is a schematic structural diagram of a first wireless device according to an embodiment of the present invention.

When the main communications module 701 is a first transceiver, the processing module 702 is a processor, and the auxiliary wake-up module 703 is a second transceiver, the first wireless device in the embodiments of the present invention may be a first wireless device shown in FIG. 8.

As shown in FIG. 8, the first wireless device 8 includes a first transceiver 801, a processor 802, a second transceiver 803, a memory 804, and a bus 804. The first transceiver 801, the processor 802, the second transceiver 803, and the memory 804 are connected to each other by using the bus 805. The bus 805 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one bold line is used to represent the bus in FIG. 8, but this does not mean that there is only one bus or only one type of bus.

Figure 9:
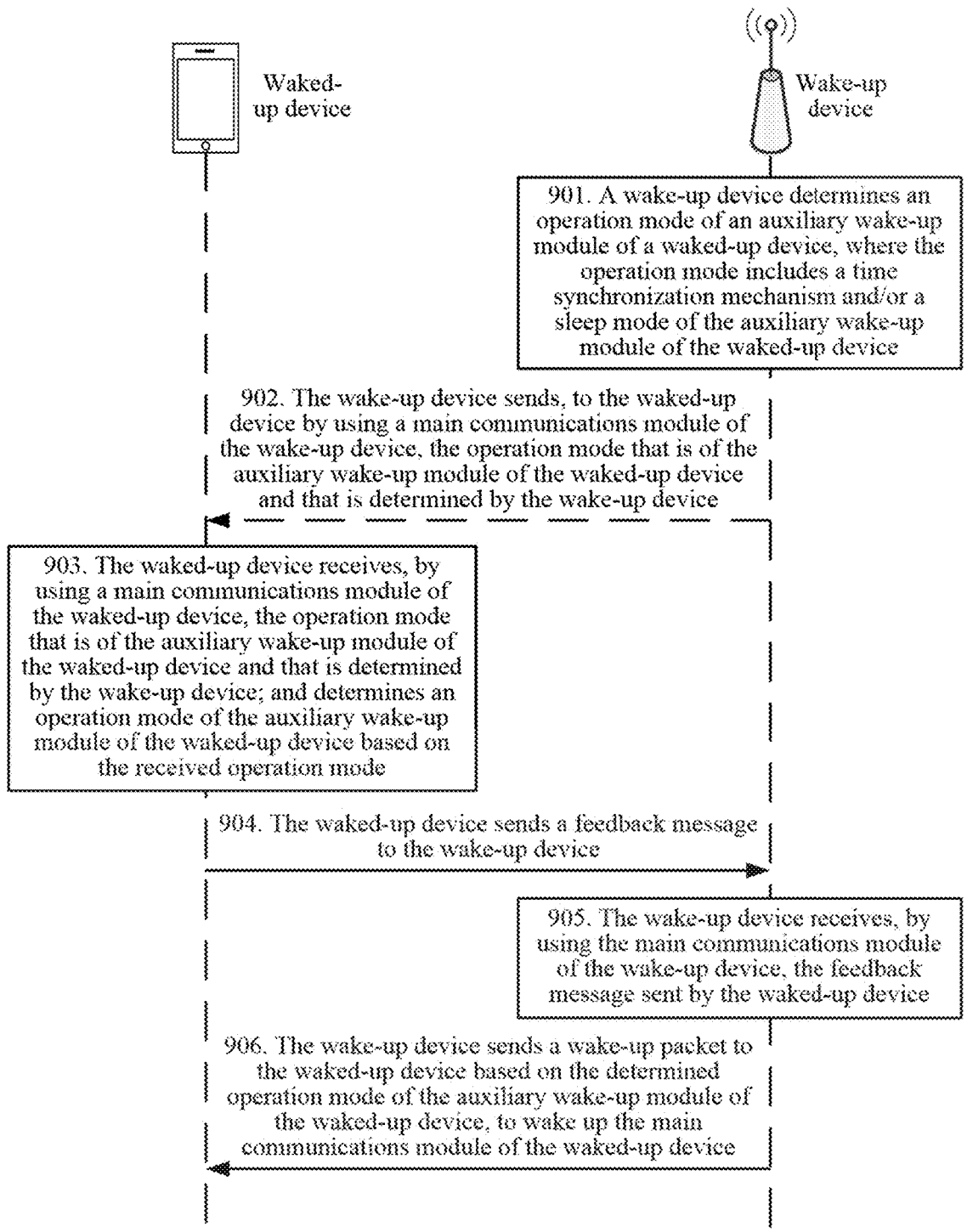
FIG. 9 is a schematic diagram of a method for waking up a wireless device according to an embodiment of the present invention.

An embodiment of the present invention further provides a method for waking up a wireless device. As shown in FIG. 9, the method includes the following steps.

901. A wake-up device determines an operation mode of an auxiliary wake-up module of a waked-up device, where the operation mode includes a time synchronization mechanism and/or a sleep mode of the auxiliary wake-up module of the waked-up device.

For the time synchronization mechanism of the auxiliary wake-up module of the waked-up device, for example, the wake-up device may determine the time synchronization mechanism of the auxiliary wake-up module of the waked-up device based on a priority of one or more of three parameters: a wake-up capability of the wake-up device, a power saving requirement of the wake-up device, or a quantity of associated waked-up devices. A priority of the wake-up capability is higher than that of the power saving requirement, and the priority of the power saving requirement is higher than that of the quantity of waked-up devices.

For example: (1) If the wake-up capability of the wake-up device supports only asynchronous wake-up, the wake-up device may determine that the time synchronization mechanism of the auxiliary wake-up module of the waked-up device is an asynchronous mechanism (also referred to as asynchronous wake-up or an asynchronous mode). In the asynchronous mechanism, the wake-up device does not need to stay time-synchronized with the auxiliary wake-up module of the waked-up device, and the wake-up device does not send a time synchronization frame to the auxiliary wake-up module of the waked-up device, or the auxiliary wake-up module of the waked-up device does not receive a time synchronization frame sent by the wake-up device.

(2) If the wake-up capability of the wake-up device supports only synchronous wake-up, the wake-up device may determine that the time synchronization mechanism of the auxiliary wake-up module of the waked-up device is a synchronous mechanism. In the synchronous mechanism, the wake-up device stays time-synchronized with the auxiliary wake-up module of the waked-up device, and the wake-up device periodically sends time synchronization frames to the auxiliary wake-up module of the waked-up device, or the auxiliary wake-up module of the waked-up device periodically receives time synchronization frames sent by the wake-up device.

(3) When the wake-up capability of the wake-up device supports both asynchronous wake-up and synchronous wake-up, if the wake-up device requires power saving, the wake-up device may determine that the time synchronization mechanism of the auxiliary wake-up module of the waked-up device is an asynchronous mechanism, and the wake-up device does not send a time synchronization frame to the auxiliary wake-up module of the waked-up device, so as to save power for the wake-up device.

(4) When the wake-up device supports both asynchronous wake-up and synchronous wake-up, if the wake-up device does not require power saving, for example, the wake-up device has active power supply, the wake-up device may determine that the time synchronization mechanism of the auxiliary wake-up module of the waked-up device is a synchronous mechanism, and the wake-up device stays time-synchronized with the auxiliary wake-up module of the waked-up device, so as to simplify a wake-up operation.

(5) When the wake-up device supports both asynchronous wake-up and synchronous wake-up, and requires power saving, if the wake-up device is associated with a very small quantity of waked-up devices, for example, only one waked-up device, the wake-up device may determine that the time synchronization mechanism of the auxiliary wake-up module of the waked-up device is an asynchronous mechanism, and the wake-up device does not send a time synchronization frame to the auxiliary wake-up module of the waked-up device, so as to save power for the wake-up device.

(6) When the wake-up device supports both asynchronous wake-up and synchronous wake-up, and does not require power saving, if the wake-up device is associated with a relatively large quantity of waked-up devices, the wake-up device may determine that the time synchronization mechanism of the auxiliary wake-up module of the waked-up device is a synchronous mechanism, and the wake-up device stays time-synchronized with the auxiliary wake-up module of the waked-up device, so as to simplify a wake-up operation.

For the sleep mode of the auxiliary wake-up module of the waked-up device, specifically, the wake-up device may determine the sleep mode of the auxiliary wake-up module of the waked-up device based on one or more of the time synchronization mechanism, the quantity of waked-up devices associated with the wake-up device, or an application scenario. The sleep mode of the auxiliary wake-up module includes a duty-cycling period and a wake window length or proportion of the auxiliary wake-up module; or the sleep mode of the auxiliary wake-up module includes a duty-cycling period and a sleep time length or proportion of the auxiliary wake-up module.

For example: (1) When the time synchronization mechanism is the asynchronous mechanism, the wake window length of duty-cycling of the auxiliary wake-up module of the waked-up device may be set to a relatively long time, for example, the duty-cycling period may be 100 milliseconds, and the wake window length is 10 milliseconds, so that the wake-up device can wake up a plurality of waked-up devices.

(2) When the time synchronization mechanism is the synchronous mechanism, the wake window length of duty-cycling of the auxiliary wake-up module of the waked-up device may be set to a relatively short time, for example, the duty-cycling period may be 100 milliseconds, and the wake window length is 2 milliseconds, so as to save power for the waked-up device.

(3) If the wake-up device is associated with a relatively large quantity of waked-up devices, the wake window length of duty-cycling of the auxiliary wake-up module of the waked-up device may be set to a relatively long time, for example, the duty-cycling period may be 100 milliseconds, and the wake window length is 10 milliseconds, so that the wake-up device can wake up a plurality of waked-up devices.

(4) If the wake-up device is associated with a relatively small quantity of waked-up devices, for example, the wake-up device is associated with only one waked-up device, the wake window length of duty-cycling of the auxiliary wake-up module of the waked-up device may be set to a relatively short time, for example, the duty-cycling period may be 100 milliseconds, and the wake window length is 2 milliseconds, so as to save power for the waked-up device.

(5) If the application scenario requires a small application delay, the duty-cycling period of the auxiliary wake-up module of the waked-up device may be set to be relatively small, for example, 20 milliseconds.

(6) If the application scenario does not have a high requirement for an application delay, that is, the delay may be relatively large, the duty-cycling period of the auxiliary wake-up module of the waked-up device may be set to be relatively long, for example, 100 milliseconds, so as to save power for the auxiliary wake-up module of the waked-up device.

902. The wake-up device sends, to the waked-up module by using a main communications module of the wake-up device, the operation mode that is of the auxiliary wake-up module of the waked-up device and that is determined by the wake-up device.

The wake-up device may send, to the waked-up device by using a beacon frame (Beacon Frame), a probe response frame (Probe Response), an association response frame (Association Response), a reassociation response frame (Reassociation Response), or a public action frame (Public Action Frame), the operation mode that is of the auxiliary wake-up module of the waked-up device and that is determined by the wake-up device. The operation mode that is of the auxiliary wake-up module of the waked-up device and that is determined by the wake-up device may be loaded to the beacon frame, the probe response frame, the association response frame, or the reassociation response frame as a new information element (Information Element, IE).

903. The waked-up device receives, by using a main communications module of the waked-up device, the operation mode that is of the auxiliary wake-up module of the waked-up device and that is determined by the wake-up device; and determines an operation mode of the auxiliary wake-up module of the waked-up device based on at least the received operation mode.

After receiving the operation mode that is of the auxiliary wake-up module of the waked-up device and that is determined by the wake-up device, the waked-up device needs to further determine the operation mode of the auxiliary wake-up module of the waked-up device, and configure the auxiliary wake-up module of the waked-up device based on the operation mode determined by the waked-up device.

If the waked-up device accepts the operation mode that is of the auxiliary wake-up module of the waked-up device and that is determined by the wake-up device, for example, the waked-up device can support the operation mode, the waked-up device determines that the operation mode of the auxiliary wake-up module of the waked-up device is the received operation mode that is of the auxiliary wake-up module of the waked-up device and that is determined by the wake-up device, and configures the auxiliary wake-up module of the waked-up device based on the operation mode.

If the waked-up device rejects the operation mode that is of the auxiliary wake-up module of the waked-up device and that is determined by the wake-up device, for example, the waked-up device cannot support the operation mode, the waked-up device needs to re-determine the operation mode of the auxiliary wake-up module of the waked-up device. For example, the waked-up device may determine the operation mode of the auxiliary wake-up module of the waked-up device based on one or more of the quantity of wake-up devices associated with the waked-up device, the wake-up capability information of the wake-up device, or the power saving requirement of the wake-up device, where the operation mode includes the time synchronization mechanism and/or the sleep mode of the auxiliary wake-up module.

904. The waked-up device sends a feedback message to the wake-up device.

After determining the operation mode of the auxiliary wake-up module of the waked-up device, the waked-up device sends the feedback message to the wake-up device.

The feedback message may indicate that the waked-up device accepts the operation mode that is of the auxiliary wake-up module of the waked-up device and that is confirmed by the wake-up device.

Alternatively, the feedback message may indicate that the waked-up device rejects the operation mode that is of the auxiliary wake-up module of the waked-up device and that is confirmed by the wake-up device, and the feedback message may include the operation mode that is of the auxiliary wake-up module of the waked-up device and that is determined by the waked-up device.

The feedback message may be a public action frame (Public Action Frame, or content of the feedback message may be carried in a probe request frame, an association request frame, or a reassociation request frame as a new information element (Information Element, IE).

905. The wake-up device receives, by using the main communications module of the wake-up device, the feedback message sent by the waked-up device.

The feedback message may indicate that the waked-up device accepts the operation mode that is of the auxiliary wake-up module of the waked-up device and that is confirmed by the wake-up device.

Alternatively, the feedback message may indicate that the waked-up device rejects the operation mode that is of the auxiliary wake-up module of the waked-up device and that is confirmed by the wake-up device, and the feedback message may include the operation mode that is of the auxiliary wake-up module of the waked-up device and that is determined by the waked-up device. The wake-up device may accept the operation mode that is of the auxiliary wake-up module of the waked-up device and that is determined by the waked-up device, and use the operation mode that is of the auxiliary wake-up module of the waked-up device and that is determined by the waked-up device, as an operation mode that is of the auxiliary wake-up module of the waked-up device and that is confirmed by the wake-up device.

906. The wake-up device sends a wake-up packet to the waked-up device based on the determined operation mode of the auxiliary wake-up module of the waked-up device, to wake up the main communications module of the waked-up device.

When the wake-up device determines that the time synchronization mechanism of the auxiliary wake-up module of the waked-up device is the synchronous mechanism, the wake-up device may send the wake-up packet to the auxiliary wake-up module of the waked-up device in a wake window of the auxiliary wake-up module of the waked-up device, to wake up the main communications module of the waked-up device.

When the wake-up device determines that the time synchronization mechanism of the auxiliary wake-up module of the waked-up device is the asynchronous mechanism, the wake-up device does not know a wake window of the auxiliary wake-up module of the waked-up device. The wake-up device needs to send a plurality of wake-up packets, and at least one wake-up packet is expected to be received by the auxiliary wake-up module of the waked-up device, to wake up the main communications module of the waked-up module.

Therefore, in the embodiment shown in FIG. 9, the wake-up device actively determines the operation mode of the auxiliary wake-up module of the waked-up device, and notifies the waked-up device of the operation mode that is of the auxiliary wake-up module of the waked-up device and that is determined by the wake-up device. If the waked-up device accepts the operation mode determined by the wake-up device, the waked-up device sets the operation mode of the auxiliary wake-up module, so that the auxiliary wake-up module receives, based on the operation mode, the wake-up packet sent by the wake-up device, to wake up the main communications module of the waked-up device. If the waked-up device rejects the operation mode determined by the wake-up device, the waked-up device itself may set the operation mode of the auxiliary wake-up module, and notify the wake-up device of the operation mode set by the waked-up device, so that the wake-up device sends the wake-up packet to the auxiliary wake-up module of the waked-up device based on the operation mode, to wake up the main communications module of the waked-up device. In this way, when the operation mode of the auxiliary wake-up module is asynchronous wake-up, the auxiliary wake-up module does not need to maintain clock information or receive a time synchronization frame from the wake-up device, thereby resolving a problem that additional energy consumption and communication overheads of a wake-up device and a waked-up device are large.

The foregoing describes the solutions provided in the embodiments of the present invention mainly from a perspective of a second wireless device, namely, the wake-up device. It may be understood that, to implement the foregoing functions, the second wireless device includes corresponding hardware structures and/or software modules for executing the functions. A person skilled in the art should easily be aware that algorithm steps described with reference to the embodiments disclosed in this specification may be implemented by hardware or a combination of hardware and computer software in the present invention. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the present invention.

In the embodiments of the present invention, function modules of the second wireless device may be divided according to the foregoing method examples. For example, the function modules may be divided based on the functions, or at least two functions may be integrated in one processing module. The integrated module may be implemented in a form of hardware, or may be implemented in a form of a software function module. It should be noted that the unit division in the embodiments of the present invention is an example, is merely logical function division, and may be other division in actual implementation.

Figure 10:
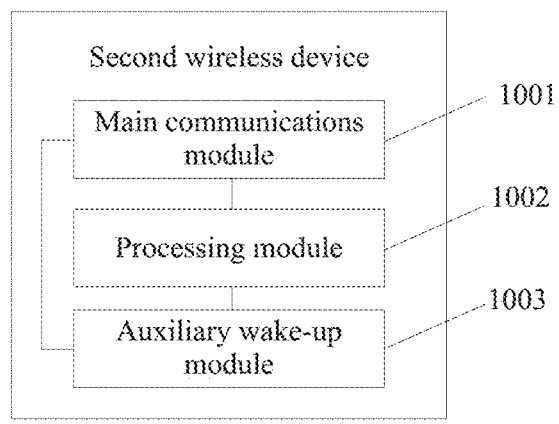
FIG. 10 is a schematic structural diagram of a second wireless device according to an embodiment of the present invention.

When the function modules are divided based on the functions, FIG. 10 shows a possible schematic structural diagram of the second wireless device in the foregoing embodiments. The second wireless device includes a main communications module 1001, a processing module 1002, and an auxiliary wake-up module 1003. The main communications module 1001 is configured to support the second wireless device in performing processes 902, 905, and 906 in FIG. 9. The processing module 1002 is configured to support the second wireless device in performing process 901 in FIG. 9. The auxiliary wake-up module 1003 is configured to: when the second wireless device is used as a waked-up device, perform the steps related to the auxiliary wake-up module in the foregoing waked-up device. For function descriptions of the corresponding function modules, refer to all related content of the steps in the foregoing method embodiments. Details are not described herein again.

Figure 11:
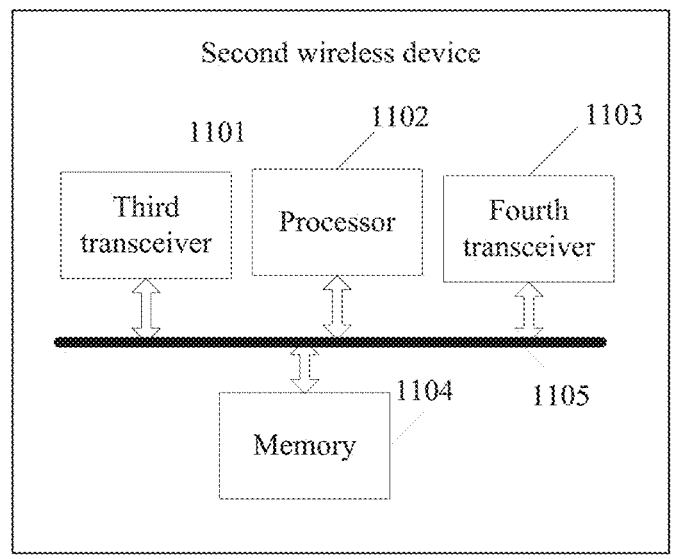
FIG. 11 is a schematic structural diagram of a second wireless device according to an embodiment of the present invention.

When the main communications module 1001 is a third transceiver, the processing module 1002 is a processor, and the auxiliary wake-up module 1003 is a fourth transceiver, the second wireless device in the embodiments of the present invention may be a second wireless device shown in FIG. 11.

As shown in FIG. 11, the second wireless device includes a third transceiver 1101, a processor 1102, a fourth transceiver 1103, a memory 1104, and a bus 1104. The third transceiver 1101, the processor 1102, the second transceiver 1103, and the memory 1104 are connected to each other by using the bus 1105. The bus 1105 may be a peripheral component interconnect bus, an extended industry standard architecture bus, or the like. The bus may be classified into an address bus, a data bus, a control bus, and the like. For ease of representation, only one bold line is used to represent the bus in FIG. 11, but this does not mean that there is only one bus or only one type of bus.

Method or algorithm steps described with reference to the content disclosed in the present invention may be implemented by hardware, or may be implemented by a processor by executing a software instruction. The software instruction may include a corresponding software module. The software module may be stored in a random access memory (Random Access Memory, RAM), a flash memory, a read-only memory (Read-Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may alternatively be a component of the processor. The processor and the storage medium may be located in the ASIC. In addition, the ASIC may be located in a core network interface device. Certainly, the processor and the storage medium may alternatively exist in the core network interface device as discrete components.

A person skilled in the art should be aware that, in the foregoing one or more examples, functions described in the present invention may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

Overall ideas of some embodiments of the present invention may include:

A waked-up device obtains a power saving requirement and/or wake-up capability information of a wake-up device during or after association. The waked-up device sends a power saving requirement and/or wake-up capability information of the waked-up device to the wake-up device during or after the association. The waked-up device determines an operation mode of a WUR of the waked-up device based on one or more of "the power saving requirement of the waked-up device, the wake-up capability information of the waked-up device, a quantity of connected wake-up devices, the power saving requirement of the connected wake-up device, or the wake-up capability information of the connected wake-up device", where the operation mode includes a time synchronization mechanism of the WUR and a sleep mode of the WUR. The waked-up device sends the operation mode of the WUR of the waked-up device to the connected wake-up device during or after the association.

Ideas of solutions of some embodiments of the present invention are analyzed as follows:

A waked-up device needs to know a power saving requirement and/or wake-up capability information of a wake-up device. The power saving requirement may include whether a main communications module (for example, a Wi-Fi communications module) of the wake-up device needs to enter a sleep state and whether the wake-up device has a WUR. The wake-up capability information may include a WUR time synchronization mechanism that can be supported by the wake-up device, for example, the wake-up device supports "synchronous wake-up" and "asynchronous wake-up", or one of "synchronous wake-up" and "asynchronous wake-up", and may include WUR information of the wake-up device. The waked-up device may obtain the power saving requirement and/or the wake-up capability information of the wake-up device during or after association, and negotiate with the wake-up device on an operation mode of a WUR of the waked-up device.

1. The waked-up device needs to count a quantity of connected wake-up devices. For example, the connected wake-up devices may include only a wake-up device that is to perform data communication with the waked-up device in future, and do not include a wake-up device that was associated but has been dissociated or a wake-up device that is no longer to perform data communication with the waked-up device.

2. The waked-up device determines the operation mode of the WUR of the waked-up device based on one or more of "a power saving requirement of the waked-up device, wake-up capability information of the waked-up device, the quantity of connected wake-up devices, the power saving requirement of the connected wake-up device, or the wake-up capability information of the connected wake-up device", where the operation mode includes a sleep mode and a time synchronization mechanism of the WUR.

3. The waked-up device needs to notify the connected wake-up device of the operation mode of the WUR of the waked-up device. The waked-up device may notify the connected wake-up device of the operation mode of the WUR of the waked-up device during or after the association.

Based on the foregoing analysis, an overall solution of an embodiment is proposed as follows:

a method for waking up a wireless device, including:

obtaining, by a waked-up device, a power saving requirement and/or wake-up capability information of a wake-up device;

determining, by the waked-up device, an operation mode of a WUR of the waked-up device based on one or more of "a power saving requirement of the waked-up device, wake-up capability information of the waked-up device, a quantity of connected wake-up devices, the power saving requirement of the connected wake-up device, or the wake-up capability information of the connected wake-up device";

sending, by the waked-up device, the operation mode of the WUR of the waked-up device to the connected wake-up device; and when a message needs to be sent to the waked-up device by using a main communications module (for example, a Wi-Fi communications module), sending, by the wake-up device, a wake-up packet to the WUR of the waked-up device based on the operation mode of the WUR of the waked-up device, to wake up the main communications module of the waked-up device.

English acronyms and abbreviations used in this specification and corresponding English full names and Chinese translations are as follows:

| Acronym or abbreviation | English full name | Chinese explanation |
| --- | --- | --- |
| 4G/5G | The Fourth/Fifth Generation of Mobile Communications System | 4th/5th Generation mobile communications system |
| AP | Access Point | Access point supporting the 802.11 protocol |
| AP-WUR | AP Wake-Up Radio/Receiver | AP wake-up radio/receiver |
| BSS | Basic Service Set | Basic service set |
| IE | Information Element | Information element |
| IEEE | Institute of Electrical and Electronics Engineers | Institute of Electrical and Electronics Engineers |
| IoT | Internet of Things | Internet of Things |
| Wi-Fi | Wireless Fidelity | Wireless Fidelity |
| WLAN | Wireless Local Area Network | Wireless local area network |
| WUP | Wake-Up Packet | Wake-up packet |

-continued

| Acronym or abbreviation | English full name | Chinese explanation |
|---|---|---|
| WUR | Wake-Up Radio/Receiver | Wake-up radio/receiver |
| OFDM | Orthogonal Frequency-Division Multiplexing | Orthogonal frequency division multiplexing |
| OOK | On-Off Keying | On-off-keying |
| SG | Study Group | Study group |
| SoC | System on Chip | System on chip |
| SoftAP | Software-enabled Access Point | Software-enabled access point |
| SoftAP-WUR | SoftAP Wake-Up Radio/Receiver | SoftAP wake-up radio/receiver |
| STA | Station | Station supporting the 802.11 protocol |
| STA-WUR | STA Wake-Up Radio/Receiver | STA wake-up radio/receiver |
| STA-n-WUR | STA-n Wake-Up Radio/Receiver | STA-n wake-up radio/receiver |
| TWT | Target Wake Time | Target wake time |
| WD | Wearable Device | Wearable device |

The present invention further provides some embodiments in the following.

1. Embodiment 1

In Embodiment 1, a Wi-Fi network is used as an example. A waked-up device obtains a power saving requirement and/or wake-up capability information of a wake-up device during or after association, and negotiates with the wake-up device on an operation mode of a WUR of the waked-up device. The waked-up device sets the operation mode of the WUR of the waked-up device based on a quantity of connected wake-up devices, and/or the power saving requirement and/or the wake-up capability information of the wake-up device. The waked-up device sends the operation mode of the WUR of the waked-up device to the wake-up device during or after the association.

In Embodiment 1, two WUR time synchronization mechanisms, namely, time synchronization mechanisms of an auxiliary wake-up module, are considered: "synchronous wake-up" and "asynchronous wake-up".

In a "synchronous wake-up" mode, the WUR of the waked-up device needs to stay time-synchronized with the wake-up device, and the wake-up device may accurately know locations, on a time axis, of a target wake time and a wake window of the WUR of the waked-up device. In the "synchronous wake-up", the wake-up device needs to periodically send WUR time synchronization frames to the WUR of the waked-up device, to ensure that the WUR of the waked-up device stays time-synchronized with the wake-up device. If the wake-up device needs to wake up a main communications module of the waked-up device, the wake-up device may send n wake-up packets to the WUR of the waked-up device in the wake window of the WUR of the waked-up device. n is greater than or equal to 1.

In an "asynchronous wake-up" mode, the WUR of the waked-up device does not need to stay time-synchronized with the wake-up device, and therefore the wake-up device does not need to send a WUR time synchronization frame to the WUR of the waked-up device. In the "asynchronous wake-up" mode, the wake-up device does not know locations, on a time axis, of a target wake time and a wake window of the WUR of the waked-up device. If the wake-up device needs to wake up a main communications module of the waked-up device, the wake-up device may send n wake-up packets to the WUR of the waked-up device, and at least one wake-up packet is expected to be received by the WUR of the waked-up device. n is greater than or equal to 2. In Embodiment 1, a possible procedure in which the waked-up device negotiates with the wake-up device on the operation mode of the WUR of the waked-up device is shown in FIG. 5. In FIG. 5, a message 102 and a message 103 are a pair of messages. The message 102 and the message 103 do not coexist with a message 101. The message 101 and the pair of messages are two optional cases, and any one of the two cases may be selected. When the message 101 exists, the message 102 and the message 103 do not exist; or when the message 102 and the message 103 exist, the message 101 does not exist.

Step 1: The waked-up device (for example, a STA) may obtain the power saving requirement and/or the wake-up capability information of the wake-up device (for example, an AP) by receiving a beacon frame (Beacon Frame), a probe response frame (Probe Response Frame), or a public action frame (Public Action Frame) that is sent by the wake-up device. The waked-up device may send a probe request frame (Probe Request Frame) before obtaining the power saving requirement and/or the wake-up capability information of the wake-up device. "The power saving requirement and/or the wake-up capability information" may include:

The power saving requirement of the wake-up device may include: power supply information of the wake-up device, for example, active power supply or battery-powered; and sleep information of a main communications module (for example, a Wi-Fi communications module), for example, whether the main communications module needs to sleep, and a sleep mode of the main communications module (including a duty-cycling period and a wake time length of the main communications module).

The wake-up capability information of the wake-up device may include information about support of the wake-up device for the WUR of the waked-up device, including whether the WUR of the waked-up device is supported (for example, whether an operating channel of the WUR is supported, and whether wake-up packet sending is supported), and a time synchronization mechanism that is of the WUR of the waked-up device and that is supported by the wake-up device (synchronous wake-up is supported, asynchronous wake-up is supported, or both synchronous wake-up and asynchronous wake-up are supported).

The wake-up capability information of the wake-up device may further include information about a WUR on the wake-up device, including whether there is a WUR on the wake-up device, and function information (for example, a processing capability) and an operating channel of the WUR of the wake-up device.

The waked-up device (for example, the STA) may send a power saving requirement and/or wake-up capability information of the waked-up device to the wake-up device (for example, the AP) by using a probe request frame (Probe Request Frame), an association request frame (Association Request Frame), a reassociation request frame (Reassociation Request Frame), or a public action frame (Public Action Frame).

Alternatively, the waked-up device (for example, the STA) and the wake-up device (for example, the AP) may obtain the power saving requirement and/or the wake-up capability information of the wake-up device through user configuration, such as manual input configuration or two-dimensional code scanning, or in another manner.

The power saving requirement and/or the wake-up capability information may be transmitted by extending a vendor specific IE (vendor specific information element) in an existing message, or may be transmitted by adding a new information element (IE) to an existing message. The existing message may be any message used in step 1.

Step 2: The waked-up device (for example, the STA) may determine the operation mode of the WUR of the waked-up device based on one or more of "the power saving requirement of the waked-up device, the wake-up capability information of the waked-up device, a quantity of connected wake-up devices, the power saving requirement of the connected wake-up device, or the wake-up capability information of the connected wake-up device", where the operation mode includes the time synchronization mechanism and/or a sleep mode of the WUR. The "setting the operation mode of the WUR" may include:

setting the time synchronization mechanism of the WUR, that is, selecting the "synchronous wake-up" or the "asynchronous wake-up", where in the "synchronous wake-up" mechanism, the WUR of the waked-up device needs to stay time-synchronized with the wake-up device, and further, the WUR of the waked-up device needs to periodically receive time synchronization frames sent by the wake-up device, for example, receive a WUR time synchronization frame every 10 s; and in the "asynchronous wake-up" mechanism, the WUR of the waked-up device does not need to stay time-synchronized with the wake-up device.

Figure 1:
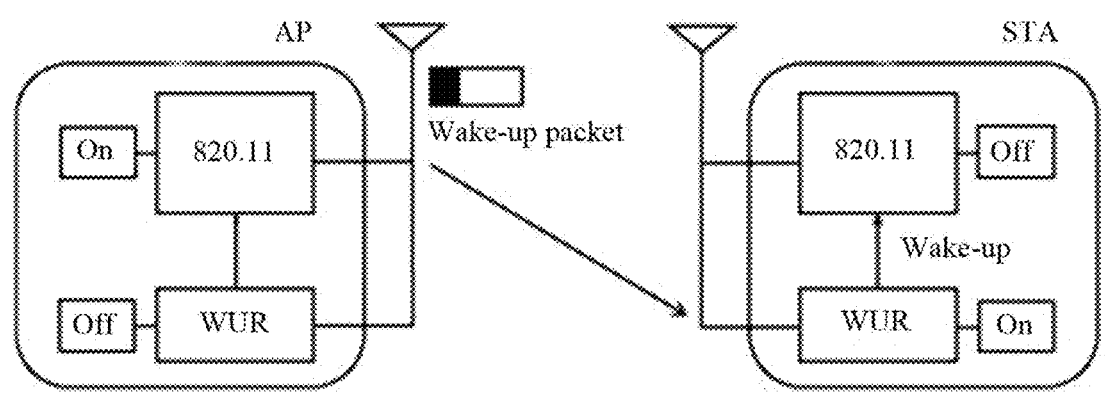
FIG. 1 is a schematic diagram of an existing wake-up method according to an embodiment of the present invention.
Figure 2:
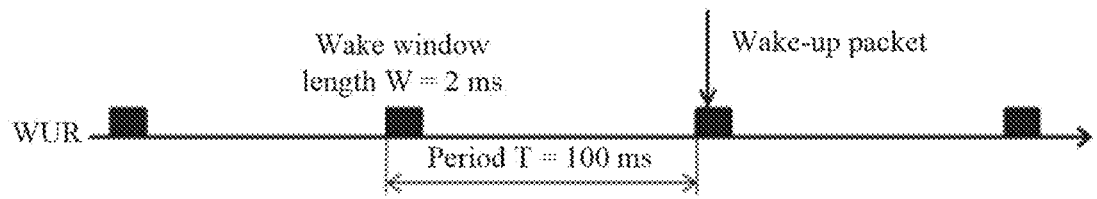
FIG. 2 is a schematic diagram of a period and a wake window length of a WUR of a waked-up device according to an embodiment of the present invention.

The "setting the operation mode of the WUR" may further include:

setting the sleep mode of the WUR, where the setting the sleep mode of the WUR may be setting a duty-cycling (Duty-Cycling) period T and a wake window length W of the WUR, for example, setting T to 100 ms and W to 2 ms, as shown in FIG. 2; or may be setting a duty-cycling (Duty-Cycling) period T of the WUR and a wake time proportion ρ of the WUR, for example, setting T to 100 ms and ρ to 2%; or may be setting a duty-cycling (Duty-Cycling) period T of the WUR and a sleep time proportion λ of the WUR, for example, setting T to 100 ms and λ to 98%.

Step 3: The waked-up device (for example, the STA) may send the operation mode of the WUR of the waked-up device to the wake-up device (for example, the AP) by using an association request frame (Association Request Frame), a reassociation request frame (Reassociation Request Frame), or a public action frame (Public Action Frame). "The operation mode of the WUR" may include:

the time synchronization mechanism of the WUR, for example, the "synchronous wake-up", in which the WUR of the waked-up device needs to stay time-synchronized with the wake-up device.

"The operation mode of the WUR" may further include:

the sleep mode of the WUR, where the sleep mode of the WUR may include the duty-cycling (Duty-Cycling) period T of the WUR and the wake window length W of the WUR, or the duty-cycling (Duty-Cycling) period T of the WUR and the wake time proportion ρ of the WUR, or the duty-cycling (Duty-Cycling) period T of the WUR and the sleep time proportion λ of the WUR.

The waked-up device may obtain, by receiving an association response frame (Association Response Frame), a reassociation response frame (Reassociation Response Frame), or an action frame (Public Action Frame) that is sent by the wake-up device, acknowledgement information indicating that the operation mode of the WUR of the waked-up device has been accepted by the wake-up device.

The operation mode of the auxiliary wake-up module (WUR) may be transmitted by extending a vendor specific IE (vendor specific information element) in an existing message, or may be transmitted by adding a new information element (IE). The existing message may be any message used in step 3.

Step 4: The waked-up device (for example, the STA) configures the operation mode of the WUR of the waked-up device.

After the waked-up device (for example, the STA) receives, by using the WUR of the waked-up device, a wake-up packet sent by the wake-up device, the waked-up device wakes up the main communications module (for example, the Wi-Fi communications module) of the waked-up device, to perform message transmission with the wake-up device.

Descriptions of a possible working procedure of a WUR operation mode setting module are as follows:

Physical components in the waked-up device provided in this embodiment of the present invention may mainly include: the main communications module (for example, an 802.11 communications module or a cellular mobile communications module), the auxiliary wake-up module (WUR), and the WUR operation mode setting module. A connection relationship between the modules is shown in FIG. 6. The main communications module provides a first wireless interface for the waked-up device, and the auxiliary wake-up module provides a second wireless interface for the waked-up device.

The WUR operation mode setting module may be a logical function module implemented by software. A main function of the WUR operation mode setting module may include: setting the operation mode of the WUR based on the quantity of connected wake-up devices, and/or the power saving requirement and/or the wake-up capability information of the wake-up device (the function of the WUR operation mode setting module may be implemented by a processor). A main function of the WUR module may include: receiving a wake-up packet from the wake-up device, and sending a wake-up signal to the main communications module. A main function of the main communications module may include: communicating with the main communications module of the wake-up device, and sending a wake-up packet. As shown in FIG. 11, FIG. 11 is another schematic structural diagram of a waked-up device according to an embodiment of the present invention. A possible working procedure of a WUR operation mode setting module in the waked-up device is shown in FIG. 7. In the example shown in FIG. 7, the WUR operation mode setting module considers only a quantity of associated wake-up devices, and a power saving requirement and wake-up capability information of the wake-up device.

As shown in FIG. 7, the possible working procedure of the WUR operation mode setting module in the wireless device is as follows:

When it is determined that a wake-up requirement changes, for example, a new wake-up device requests association, the WUR operation mode setting module of the waked-up device is triggered to enter a working state. For example, the WUR operation mode setting module may set the operation mode of the WUR of the waked-up device based on the quantity of associated wake-up devices, and the power saving requirement and the wake-up capability information of the wake-up device. This may include the following cases:

1. If only one wake-up device is connected, and the wake-up device supports only the "asynchronous wake-up", the "asynchronous wake-up" may be used. The WUR of the waked-up device does not need to stay time-synchronized with the wake-up device. The duty-cycling (Duty-Cycling) period T and the wake window length W of the WUR may be set as follows: T=100 ms, and W=2 ms.

2. If only one wake-up device is connected, and the wake-up device requires power saving, the "asynchronous wake-up" may be used. The WUR of the waked-up device does not need to stay time-synchronized with the wake-up device. The duty-cycling (Duty-Cycling) period T and the wake window length W of the WUR may be set as follows: T=100 ms, and W=2 ms.

3. If at least two wake-up devices are connected, and the wake-up devices belong to different basic service sets (BSS), or the wake-up devices belong to different network, the "asynchronous wake-up" may be used. The WUR of the waked-up device does not need to stay time-synchronized with the wake-up device. The duty-cycling (Duty-Cycling) period T and the wake window length W of the WUR may be set as follows: T=100 ms, and W=2K ms, where K is a quantity of connected wake-up devices.

4. If only one wake-up device is connected, and the wake-up device supports only the "synchronous wake-up", the "synchronous wake-up" may be used. The duty-cycling (Duty-Cycling) period T and the wake window length W of the WUR may be set as follows: T=100 ms, and W=2 ms. The WUR of the waked-up device periodically receives time synchronization frames sent by the wake-up device, for example, receives a time synchronization frame every 10 s, to ensure that the WUR of the waked-up device stays time-synchronized with the wake-up device.

5. If only one wake-up device is connected, and the wake-up device does not require power saving, the "synchronous wake-up" may be used. The duty-cycling (Duty-Cycling) period T and the wake window length W of the WUR may be set as follows: T=100 ms, and W=2 ms. The WUR of the waked-up device periodically receives time synchronization frames sent by the wake-up device, for example, receives a time synchronization frame every 10 s, to ensure that the WUR of the waked-up device stays time-synchronized with the wake-up device.

6. If at least two wake-up devices are connected, and the wake-up devices belong to a same basic service set (BSS), the "synchronous wake-up" may be used. The duty-cycling (Duty-Cycling) period T and the wake window length W of the WUR may be set as follows: T=100 ins, and W=2 ms. The WUR of the waked-up device periodically receives time synchronization frames sent by the wake-up device, for example, receives a time synchronization frame every 10 s, to ensure that the WUR of the waked-up device stays time-synchronized with the wake-up device.

After it is determined that the wake-up requirement changes, the waked-up device updates the operation mode of the WUR of the waked-up device based on one or more of "a power saving requirement of the waked-up device, wake-up capability information of the waked-up device, a quantity of connected wake-up devices, a power saving requirement of the connected wake-up device, or wake-up capability information of the connected wake-up device" that are obtained after the wake-up requirement changes. The waked-up device needs to send a new operation mode of the WUR of the waked-up device to a newly connected wake-up device. If the operation mode of the WUR changes, the waked-up device needs to send the new operation mode of the WUR of the waked-up device to the wake-up device that has been connected.

Descriptions of a possible wake-up operation of the wake-up device are as follows:

In the "synchronous wake-up" mode, the wake-up device stays time-synchronized with the WUR of the waked-up device, and the wake-up device may accurately know the locations, on the time axis, of the target wake time (Target Wake Time, TWT) and the wake window (Wake Window) of the WUR of the waked-up device. The wake-up device may choose to send a wake-up packet to the WUR of the waked-up device in the wake-window of the WUR, to wake up the main communications module (for example, the Wi-Fi communications module) of the waked-up device, as shown in FIG. 2.

In the "asynchronous wake-up" mode, the wake-up device does not know the locations, on the time axis, of the target wake time (Target Wake Time, TWT) and the wake window (Wake Window) of the WUR of the waked-up device. In a wake-up attempt, the wake-up device may start from a random time point and send n wake-up packets, as shown in FIG. 8. n is greater than or equal to T/V, and V is a time interval for sending two adjacent wake-up packets. Considering a delay and randomness caused by channel contention, a time interval at which the wake-up device consecutively sends two wake-up packets is random, that is, the parameter V is random. However, the wake-up device needs to ensure that V≤W, to expect that at least one of the n sent wake-up packets falls within the wake window of the WUR of the waked-up device, and the wake-up packet can be received by the WUR, so as to wake up the main communications module (for example, the Wi-Fi communications module) of the waked-up device.

2. Embodiment 2

Compared with that in Embodiment 1, in Embodiment 2, an operation mode of a WUR of a waked-up device is also set by a wake-up device. The "operation mode of a WUR" includes a time synchronization mechanism and/or a sleep mode of the WUR.

Compared that in Embodiment 1. In Embodiment 2, the waked-up device sends a power saving requirement and/or wake-up capability information of the waked-up device to the wake-up device during or after association, and the waked-up device obtains a power saving requirement and/or wake-up capability information of the wake-up device during or after the association. The waked-up device may not set the operation mode of the WUR of the waked-up device, or an operation mode of the WUR that is selected or set by the waked-up device may be rejected by the wake-up device, and the operation mode of the WUR of the waked-up device may be set by the wake-up device.

FIG. 9 shows a possible procedure in which the waked-up device (for example, a STA) negotiates with the wake-up device (for example, an AP) on the operation mode of the waked-up device during or after the association. In FIG. 9, a message 202 and a message 203 are a pair of messages. The message 202 and the message 203 do not coexist with a message 201. When the message 201 exists, the message 202 and the message 203 do not exist; or when the message 202 and the message 203 exist, the message 201 does not exist.

Step 1: In Embodiment 2, a possible process in which the waked-up device (for example, the STA) obtains the power saving requirement and/or the wake-up capability information of the wake-up device (for example, the AP) may be the same as that described in step 1 in Embodiment 1.

A possible process in which the waked-up device (for example, the STA) sends the power saving requirement and/or the wake-up capability information of the waked-up device to the wake-up device (for example, the AP) may be the same as that described in step 1 in Embodiment 1.

Step 2: In Embodiment 2, a possible process in which the waked-up device (for example, the STA) selects or sets the operation mode of the WUR of the waked-up device based on a quantity of connected wake-up devices, and/or the power saving requirement and/or the wake-up capability information of the wake-up device may be the same as that described in step 2 in Embodiment 1.

Step 3: In Embodiment 2, a possible process in which the waked-up device (for example, the STA) sends the operation mode of the WUR of the waked-up device to the connected wake-up device (for example, the AP) may be the same as that described in step 3 in Embodiment 1.

A difference from Embodiment 1 is: In Embodiment 2, the waked-up device may not determine the operation mode of the WUR of the waked-up device, or an operation mode of the WUR that is determined or selected by the waked-up device may be rejected by the wake-up device, and the operation mode of the WUR of the waked-up device may be determined or re-determined by the wake-up device.

The waked-up device may obtain, by receiving a probe response frame, an association response frame, a reassociation response frame, or a public action frame that is sent by the wake-up device, the operation mode that is of the WUR of the waked-up device and that is determined by the wake-up device.

The waked-up device may send acknowledgement information of the operation mode of the WUR of the waked-up device to the wake-up device by using a public action frame.

The operation mode of the auxiliary wake-up module (WUR) may be transmitted by extending a vendor specific IE (vendor specific information element) in an existing message, or may be transmitted by adding a new information element (IE).

Step 4: The waked-up device example, the STA) configures the operation mode of the WUR of the waked-up device.

3. Embodiment 3

In Embodiment 3, as shown in FIG. 10, a waked-up device (STA-1) has established a connection to a first wake-up device (AP), and may communicate with the AP for a plurality of times. The waked-up device (STA-1) is currently used as a software-enabled access point (SoftAP), and a second wake-up device (STA-2) may need to be associated with and communicate with the waked-up device (STA-1). The second wake-up device (STA-2) has a WUR, and the second wake-up device requires power saving. Therefore, the second wake-up device may also become a waked-up device.

For the first wake-up device (for example, the AP), the waked-up device (STA-1) is an associated STA. For the second wake-up device (for example, the STA-2), the waked-up device (STA-1) is a software-enabled access point (SoftAP). For example, the waked-up device (STA-1) may have two Wi-Fi communications modules that can operate simultaneously, and the two Wi-Fi communications modules operate on two different frequency bands: 2.4 GHz and 5 GHz. The waked-up device (STA-1) may communicate with the first wake-up device (AP) by using the 5-GHz Wi-Fi communications module, and the waked-up device (STA-1) may communicate with the second wake-up device (STA-2) by using the 2.4 GHz Wi-Fi communications module. The waked-up device (STA-1) may have only one WUR module, and therefore a STA-1-WUR and a SoftAP-WUR in the following descriptions are a same WUR module. FIG. 10 shows a possible procedure in which the waked-up device (STA-1) updates an operation mode of the WUR of the waked-up device (STA-1), in FIG. 10, a message 302 and a message 303 are a pair of messages. The message 302 and the message 303 do not coexist with a message 301. When the message 301 exists, the message 302 and the message 303 do not exist; or when the message 302 and the message 303 exist, the message 301 does not exist.

As shown in FIG. 10, a possible process in which the waked-up device (STA-2) sets the operation mode of the WUR of the waked-up device (STA-2) may be the same as those described in step 1, step 2, step 3, and step 4 in Embodiment 1.

The waked-up device (SoftAP) may send a power saving requirement and/or wake-up capability information of the waked-up device to the wake-up device (STA-2) by using a beacon frame (Beacon Frame), a probe response frame (Probe Response Frame), an association response frame (Association Response Frame), a reassociation response frame (Reassociation Response Frame), or a public action frame (Public Action Frame).

As shown in FIG. 10, the waked-up device (STA-1) updates the operation mode of the WUR of the waked-up device depending on a change of a wake-up requirement, for example, an increase in a quantity of wake-up devices. The "updating the operation mode of the WUR of the waked-up device" may include:

updating a time synchronization mechanism of the WUR of the waked-up device, for example, changing the time synchronization mechanism from "synchronous wake-up" to "asynchronous wake-up".

The "updating the operation mode of the WUR of the waked-up device" may further include:

the updating the operation mode of the WUR of the waked-up device may include: re-setting the sleep mode of the WUR, including a duty-cycling (Duty-Cycling) period T and/or a wake window length W of the WUR; or setting a duty-cycling (Duty-Cycling) period T of the WUR and/or a wake time proportion $\rho$ of the WUR; or setting a duty-cycling (Duty-Cycling) period T of the WUR and/or a sleep time proportion $\lambda$ of the WUR.

The waked-up device may send a new operation mode of the WUR of the waked-up device to a connected wake-up device (for example, the AP and the STA-2) by using a public action frame (Public Action Frame).

The waked-up device may receive, by using a public action frame (Public Action Frame), a confirmation of the wake-up device for the new operation mode of the WUR of the waked-up device.

The operation mode of the auxiliary wake-up module (WUR) may be transmitted by extending a vendor specific IE (vendor specific information element) in an existing message, or may be transmitted by adding a new information element (IE).

Waked-Up Device

An embodiment of the present invention provides a waked-up device. According to any one of claims 11 to 18, a specific structure of the waked-up device may be the structure of the waked-up device shown in FIG. 4, where a module 400 is corresponding to the waked-up device. The waked-up device 400 includes submodules 401, 402, 403, 404, and 405. The submodule 401 is corresponding to a first transceiver, namely, a first wireless interface, of the waked-up device; may be provided by a main communications module (for example, an 802.11 communications module); and may be configured to: send a wake-up packet, and send and receive another message. The submodule 402 is corresponding to a second receiver of the waked-up device, and is an example of a second wireless interface; may be provided by an auxiliary wake-up module (for example, a WUR); and may be configured to: receive a wake-up packet sent by a wake-up device, and after receiving the wake-up packet, send a wake-up signal to the first wireless interface, to wake up the first wireless interface. The submodule 403 is corresponding to a processor (there may be one or more processors), and may implement functions of the foregoing WUR operation mode setting module. The submodule 404 is corresponding to a memory (there may be one or more memories). The submodule 403 and the submodule 404 may be shared by the first wireless interface and the second wireless interface. In the example, the first wireless interface 401 and the second wireless interface 402 may share one antenna submodule 405, mainly to reduce device hardware costs and achieve simple implementation. Alternatively, the first wireless interface 401 and the second wireless interface 402 may be corresponding to different antennas, especially when the first wireless interface 401 and the second wireless interface 402 operate on different frequency bands. In an actual product, the waked-up device 400 may be implemented by a system on chip (SoC) or an integrated circuit.

In this specification, a Wi-Fi interface is a wireless interface provided by a Wi-Fi module. An 802.11 interface is the same as the Wi-Fi interface, and both interfaces are wireless interfaces provided by an 802.11 module. The Wi-Fi module is the same as the 802.11 module. A WUR interface is a wireless interface provided by a WUR module. The WUR module is the same as an auxiliary wake-up module.

Beneficial Effect

Figure 3:
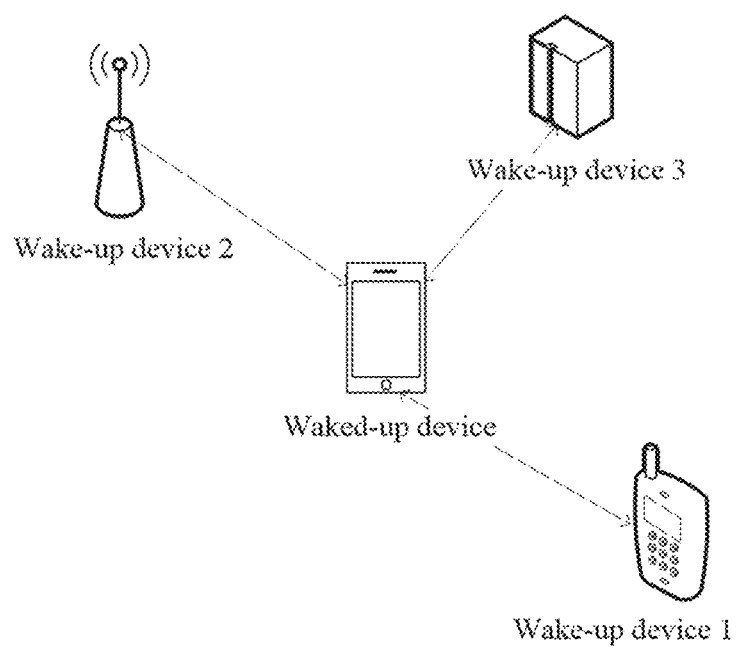
FIG. 3 is a schematic diagram of a waked-up device connected to a plurality of wake-up devices according to an embodiment of the present invention.

A beneficial effect brought by the embodiments of the present invention may include one or more of the following:

In the embodiments of the present invention, a waked-up device determines an operation mode of a WUR of the waked-up device based on one or more of "a power saving requirement of the waked-up device, wake-up capability information of the waked-up device, a quantity of connected wake-up devices, a power saving requirement of a connected wake-up device, or wake-up capability information of the connected wake-up device". In the embodiments of the present invention, the waked-up device may be enabled to choose to use a "synchronous wake-up" mechanism or an "asynchronous wake-up" mechanism depending on an application scenario, and optimize and set a parameter of a sleep mode of the WUR. According to the proposed technical solutions, energy consumption of the waked-up device and the wake-up device can be balanced, and additional energy consumption and communication overheads that are brought by a complex time synchronization operation and time synchronization retention are avoided. The beneficial effect of the embodiments of the present invention may further include:

If the wake-up device also requires power saving, according to the "asynchronous wake-up" mechanism in the embodiments of the present invention, power consumption of the waked-up device and the wake-up device can be effectively balanced. Especially in a wearable scenario (as shown in FIG. 3) in which a smartphone is used as a software-enabled access point (SoftAP) and a wake-up device, according to the embodiments provided in the present invention, power consumption of the smartphone can be significantly reduced.

If there are a plurality of wake-up devices, according to the "asynchronous wake-up" mechanism in the embodiments of the present invention, communication overheads brought by time synchronization retention can be effectively avoided, and processing complexity and energy consumption brought by the time synchronization retention to the WUR are avoided.

Depending on a dynamic change of a wake-up requirement, the waked-up device dynamically updates the operation mode of the WUR of the waked-up device, for example, switches the operation mode between two modes: "synchronous wake-up" and "asynchronous wake-up". The embodiments of the present invention may be applicable to a plurality of application environments and meet power saving requirements of different devices.

Mutual reference may be made between the embodiment shown in FIG. 5 of the present invention and Embodiment 1. For step 501 in the embodiment shown in FIG. 5 of the present invention, refer to step 1 in Embodiment 1. For step 502 in the embodiment shown in FIG. 5 of the present invention, refer to step 2 and step 4 in Embodiment 1. For step 503 in the embodiment shown in FIG. 5 of this application, refer to step 3 in Embodiment 1. For the scenario shown in FIG. 6 of this application in which the operation mode set by the waked-up device is rejected by the waked-up device, and the embodiment shown in FIG. 9 in which the wake-up device sets the operation mode of the auxiliary wake-up module of the waked-up device, refer to related content in Embodiment 2 in which the wake-up device sets the operation mode of the auxiliary wake-up module of the waked-up device. For step 604 in the embodiment in FIG. 6 of this application, refer to step 4 in Embodiment 2. For descriptions of step 506 in the embodiment shown in FIG. 5 of this application, refer to Embodiment 3, namely, descriptions of a case in which the quantity of wake-up devices associated with the waked-up device and/or the indication information change/changes.

What is claimed is:

1. A first wireless device, comprising:
an auxiliary wake-up circuit;
a main communications circuit coupled to the auxiliary wake-up circuit and configured to obtain indication information of at least one second wireless device, wherein the indication information comprises at least one of a power saving requirement or wake-up capability information, and wherein the wake-up capability information indicates that the second wireless device supports at least one of synchronous wake-up or asynchronous wake-up; and a processor coupled to the auxiliary wake-up circuit and configured to determine an operation mode of the auxiliary wake-up circuit of the first wireless device based on at least one of a quantity of second wireless devices or the indication information, wherein the operation mode comprises at least one of a time synchronization mechanism or a sleep mode of the auxiliary wake-up circuit, and wherein the auxiliary wake-up circuit is configured to receive, based on the operation mode, a wake-up packet from the at least one second wireless device to wake up the main communications circuit of the first wireless device.

2. The first wireless device of claim 1, wherein the main communications circuit is further configured to send the operation mode of the auxiliary wake-up circuit to the at least one second wireless device.

3. The first wireless device of claim 1, wherein the main communications circuit is further configured to:

receive an acknowledgement message from the at least one second wireless device, wherein the acknowledgement message indicates that at least one of the time synchronization mechanism or the sleep mode in the operation mode is accepted by the at least one second wireless device; or receive at least one of the time synchronization mechanism or the sleep mode of the auxiliary wake-up circuit of the first wireless device from the at least one second wireless device.

4. The first wireless device of claim 1, wherein the processor is further configured to set the operation mode of the auxiliary wake-up circuit of the first wireless device based on a priority relationship between at least two of the following three parameters:

the quantity of the second wireless devices;

the power saving requirement of the at least one second wireless device; or the wake-up capability information of the at least one second wireless device, and wherein the priority relationship comprises at least one of the following:

a priority of the wake-up capability information is higher than a priority of the quantity of the second wireless devices; or the priority of the quantity of the second wireless devices is higher than a priority of the power saving requirement.

5. The first wireless device of claim 4, wherein the indication information comprises either the wake-up capability information or the wake-up capability information and the power saving requirement, wherein the processor is further configured to determine, based on the priority relationship, that the time synchronization mechanism of the auxiliary wake-up circuit of the first wireless device is to be determined based on the wake-up capability information, and wherein in a manner of determining the time synchronization mechanism, the processor is further configured to:

determine that the auxiliary wake-up circuit of the first wireless device needs to stay time-synchronized with the at least one second wireless device when the wake-up capability information represents that the at least one second wireless device supports only the synchronous wake-up; and determine that auxiliary wake-up circuit of the first wireless device does not need to stay time-synchronized with the at least one second wireless device when the wake-up capability information represents that the at least one second wireless device supports only the asynchronous wake-up.

6. The first wireless device of claim 4, wherein the indication information comprises the power saving requirement, wherein the processor is further configured to determine, based on the priority relationship, that the priority of the quantity of second wireless devices is higher than the priority of the power saving requirement, and wherein in a manner of determining that the priority of the quantity of second wireless devices is higher than the priority of the power saving requirement, the processor is further configured to:

determine whether the power saving requirement represents that the at least one second wireless device requires power saving when the quantity of the second wireless devices is equal to one, or the quantity of the second wireless devices is greater than or equal to two and the second wireless devices belong to a same basic service set, set the auxiliary wake-up circuit of the first wireless device not to be time-synchronized with the at least one second wireless device when the power saving requirement represents that the at least one second wireless device requires the power saving, set the auxiliary wake-up circuit of the first wireless device to be time-synchronized with the at least one second wireless device when the power saving requirement represents that the at least one second wireless device does not require the power saving; and set the auxiliary wake-up circuit of the first wireless device not to be time-synchronized with the at least one second wireless device when the quantity of the second wireless devices is greater than or equal to two and the second wireless devices belong to different basic service sets.

7. The first wireless device of claim 1, wherein the sleep mode comprises a duty-cycling period and a wake window length of the auxiliary wake-up circuit, and wherein the processor is further configured to set the duty-cycling period and the wake window length of the auxiliary wake-up circuit of the first wireless device based on at least one of the quantity of the second wireless devices or the indication information to enable the at least one second wireless device to determine a quantity of wake-up packets and a time interval between the wake-up packets based on the duty-cycling period and the wake window length of the auxiliary wake-up circuit, wherein the time interval is less than or equal to the wake window length, wherein the quantity of the wake-up packets is greater than or equal to one when the auxiliary wake-up circuit stays time-synchronized with the at least one second wireless device, and wherein the quantity of the wake-up packets is greater than or equal to a ratio of the duty-cycling period of the auxiliary wake-up circuit to the time interval when the auxiliary wake-up circuit does not stay time-synchronized with the at least one second wireless device.

8. The first wireless device of claim 1, wherein the quantity of the second wireless devices or the indication information changes, and wherein the processor is further configured to update the operation mode of the auxiliary wake-up circuit of the first wireless device according to the at least one second wireless device.

9. The first wireless device of claim 1, wherein the main communications circuit is a WI-FI communications circuit, and wherein the auxiliary wake-up circuit is a wake-up receiver (WUR).

10. A second wireless device, comprising:
a processor configured to determine an operation mode of an auxiliary wake-up circuit of a first wireless device, wherein the operation mode comprises a time synchronization mechanism or a sleep mode of the auxiliary wake-up circuit of the first wireless device; and
a main communications circuit coupled to the processor and configured to:
send the operation mode of the auxiliary wake-up circuit of the first wireless device to the first wireless device; and
send a wake-up packet to the auxiliary wake-up circuit of the first wireless device based on the operation mode of the auxiliary wake-up circuit of the first wireless device to wake up a main communications circuit of the first wireless device.

11. The second wireless device of claim 10, wherein the time synchronization mechanism indicates whether the auxiliary wake-up circuit of the first wireless device needs to stay time-synchronized with the second wireless device, and wherein the sleep mode comprises a duty-cycling period and a wake window length of the auxiliary wake-up circuit of the first wireless device.

12. The second wireless device of claim 10, wherein the main communications circuit is further configured to receive a feedback message from the first wireless device, wherein the feedback message indicates that either:
the first wireless device accepts the operation mode of the auxiliary wake-up circuit of the first wireless device determined by the second wireless device; or
the first wireless device rejects the operation mode of the auxiliary wake-up circuit of the first wireless device determined by the second wireless device, wherein the feedback message comprises a second operation mode of the auxiliary wake-up circuit of the first wireless device from the first wireless device.

13. The second wireless device of claim 12, wherein the processor is further configured to:
accept the second operation mode of the auxiliary wake-up circuit of the first wireless device from the first wireless device; and
set the second operation mode of the auxiliary wake-up circuit of the first wireless device from the first wireless device as the operation mode of the auxiliary wake-up circuit of the first wireless device determined by the second wireless device.

14. The second wireless device of claim 10, wherein the main communications circuit is a WI-FI communications circuit.

* * * * *